United States Patent
Trachtman et al.

(10) Patent No.: US 10,001,927 B1
(45) Date of Patent: Jun. 19, 2018

(54) TECHNIQUES FOR OPTIMIZING I/O OPERATIONS

(71) Applicant: EMC IP Holding Company LLC, Hopkinton, MA (US)

(72) Inventors: Michael Trachtman, Arlington, MA (US); Brian Lake, Edmonton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 3 days.

(21) Appl. No.: 14/501,455

(22) Filed: Sep. 30, 2014

(51) Int. Cl.
*G06F 3/06* (2006.01)
(52) U.S. Cl.
CPC ............ *G06F 3/061* (2013.01); *G06F 3/0665* (2013.01); *G06F 3/0688* (2013.01); *G06F 3/0689* (2013.01); *G06F 2212/1032* (2013.01)

(58) Field of Classification Search
CPC .................................................... G06F 3/0688
See application file for complete search history.

(56) References Cited

U.S. PATENT DOCUMENTS

| | | | |
|---|---|---|---|
| 6,715,039 B1 | 3/2004 | Michael et al. | |
| 7,032,041 B2 * | 4/2006 | Sahara | G06F 3/061 710/36 |
| 7,155,573 B1 | 12/2006 | Levin-Michael et al. | |
| 7,949,637 B1 * | 5/2011 | Burke | G06F 3/0605 707/655 |
| 8,467,281 B1 * | 6/2013 | Colon | G06F 11/0727 369/47.1 |
| 8,583,838 B1 | 11/2013 | Marshak et al. | |
| 8,688,878 B1 * | 4/2014 | Dolan | G06F 3/061 710/33 |
| 2002/0133735 A1 * | 9/2002 | McKean | G06F 11/2092 714/5.11 |
| 2005/0228950 A1 * | 10/2005 | Karr | G06F 3/0607 711/114 |
| 2009/0070541 A1 | 3/2009 | Yochai | |
| 2012/0047287 A1 * | 2/2012 | Chiu | G06F 3/0605 710/8 |
| 2014/0289478 A1 * | 9/2014 | Watanabe | G06F 12/0862 711/137 |
| 2014/0379990 A1 * | 12/2014 | Pan | G06F 12/0804 711/135 |
| 2015/0066470 A1 * | 3/2015 | Chopra | G06F 3/0605 703/20 |

* cited by examiner

*Primary Examiner* — Ann J Lo
*Assistant Examiner* — Michelle Taeuber
(74) *Attorney, Agent, or Firm* — Muirhead and Saturnelli, LLC

(57) ABSTRACT

Described are techniques for processing I/O operations. A read operation is received that is directed to a first location of a logical device. Data stored at the first location of the logical device is replicated on a plurality of data storage systems. In accordance with one or more criteria, a set of at least one of the plurality of data storage systems is determined. The one or more criteria include information describing current configuration options of the plurality of data storage systems affecting I/O operation performance. The read operation is sent to each data storage system of the set.

14 Claims, 19 Drawing Sheets

TECHNIQUES FOR OPTIMIZING I/O OPERATIONS

BACKGROUND

Technical Field

This application generally relates to data storage and, more particularly, techniques for optimizing data operations.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host may perform a variety of data processing tasks and operations using the data storage system. For example, a host may perform basic system I/O (input/output) operations in connection with data requests, such as data read and write operations.

Host systems may store and retrieve data using a data storage system containing a plurality of host interface units, disk drives (or more generally storage devices), and disk interface units. Such data storage systems are provided, for example, by EMC Corporation of Hopkinton, Mass. The host systems access the storage devices through a plurality of channels provided therewith. Host systems provide data and access control information through the channels to a storage device of the data storage system and data of the storage device is also provided from the data storage system to the host systems also through the channels. The host systems do not address the disk drives of the data storage system directly, but rather, access what appears to the host systems as a plurality of logical units, logical devices or logical volumes. The logical units may or may not correspond to the actual physical drives. Allowing multiple host systems to access the single data storage system allows the host systems to share data stored therein.

SUMMARY OF THE INVENTION

In accordance with one aspect of the invention is a method of processing I/O operations comprising: receiving a read operation directed to a first location of a logical device, wherein data stored at the first location of the logical device is replicated on a plurality of data storage systems; determining, in accordance with one or more criteria, a set of at least one of the plurality of data storage systems, wherein the one or more criteria include information describing current configuration options of the plurality of data storage systems affecting I/O operation performance; and sending the read operation to each data storage system of the set. The one or more criteria may include an indication regarding whether each of the plurality of data storage systems performs data storage optimizations. Each data storage system in the set may include a plurality of storage tiers. Each of the plurality of storage tiers may have physical storage devices with performance characteristics that differ from other performance characteristics of other physical storage devices of other ones of the plurality of storage tiers. The data storage optimizations may include automatically relocating data portions among the plurality of storage tiers in accordance with an I/O workload associated with each of the data portions. The one or more criteria may include an indication regarding whether each of the plurality of data storage systems performs sequential read pattern detection and data prefetching. The one or more criteria may include an indication regarding whether each of the plurality of data storage systems performs data caching. The one or more criteria may identify a characteristic regarding the data caching. The current configuration options of the plurality of data storage systems described by the one or more criteria may impact performance of I/O operations received subsequent to the read operation. The read operation may be received by an appliance from a host. The appliance may be a virtualization appliance abstractly representing physical storage of the plurality of data storage systems to the host. The logical device may have a logical address space divided into a plurality of partitions. The appliance may perform first processing comprising: collecting I/O workload information for each of the plurality of partitions regarding I/O operations having a target location in said each partition; analyzing the I/O workload information for each of the plurality of partitions; determining, in accordance with said analyzing, one or more of the plurality of partitions having a current I/O workload exceeding a specified threshold; and sending a plurality of read operations reading data from a location on the logical device located in a first of the one or more of the plurality of partitions to a same one of the plurality of data storage systems, said plurality of read operations including the read operation. The specified threshold may approximate a promotion threshold used by a data storage optimizer of the same one of the plurality of data storage systems to promote a data portion to a particular one of the plurality of storage tiers. The set may include two data storage systems and the read operation may be sent to each of the two data storage systems. A first of the two data storage systems may service the read operation and return requested read data, and a second of the two data storage systems may not retrieve the request read data from physical storage and may not return requested read data. The second data storage system may simulate one or more aspects of performing the read operation including any of simulating cache contents and cache-related information to reflect having performed the read operation and simulating generating updated I/O workload information to reflect having performed the read operation, wherein the updated I/O workload information is used by a data storage optimizer on the second data storage system to determine placement of data portions on different ones of the plurality of storage tiers of the second data storage system. The set may include two data storage systems and the read operation may be sent to each of the two data storage systems. Each of the two data storage systems may collect I/O workload information for data portions of the logical device whereby the I/O workload information may be used by a data storage optimizer of said each data storage system to locate data portions having highest I/O workload to a flash storage tier. At least some data portions of the logical device may be located on the flash storage tier of said each data storage system. The method may include detecting failure of a first of the two data storage systems; and subsequent to the failure, sending all I/O operations directed to the logical device to the second of the two data storage systems.

In accordance with another aspect of the invention is a system comprising: a processor; and a memory comprising code stored thereon that, when executed, performs a method of processing I/O operations comprising: receiving a read operation directed to a first location of a logical device, wherein data stored at the first location of the logical device is replicated on a plurality of data storage systems; determining, in accordance with one or more criteria, a set of at least one of the plurality of data storage systems, wherein the one or more criteria include information describing current configuration options of the plurality of data storage systems affecting I/O operation performance; and sending the read operation to each data storage system of the set.

In accordance with another aspect of the invention is a non-transitory computer readable medium comprising code stored thereon that, when executed, performs a method of processing I/O operations comprising: receiving a read operation directed to a first location of a logical device, wherein data stored at the first location of the logical device is replicated on a plurality of data storage systems; determining, in accordance with one or more criteria, a set of at least one of the plurality of data storage systems, wherein the one or more criteria include information describing current configuration options of the plurality of data storage systems affecting I/O operation performance; and sending the read operation to each data storage system of the set. The one or more criteria may include an indication regarding whether each of the plurality of data storage systems performs data storage optimizations. Each data storage system in the set may include a plurality of storage tiers. Each of the plurality of storage tiers may have physical storage devices with performance characteristics that differ from other performance characteristics of other physical storage devices of other ones of the plurality of storage tiers. The data storage optimizations may include automatically relocating data portions among the plurality of storage tiers in accordance with an I/O workload associated with each of the data portions. The one or more criteria may include an indication regarding whether each of the plurality of data storage systems performs sequential read pattern detection and data prefetching. The one or more criteria may include an indication regarding whether each of the plurality of data storage systems performs data caching. The one or more criteria may identify a characteristic regarding the data caching.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF
EMBODIMENT(S)

Figure 1:
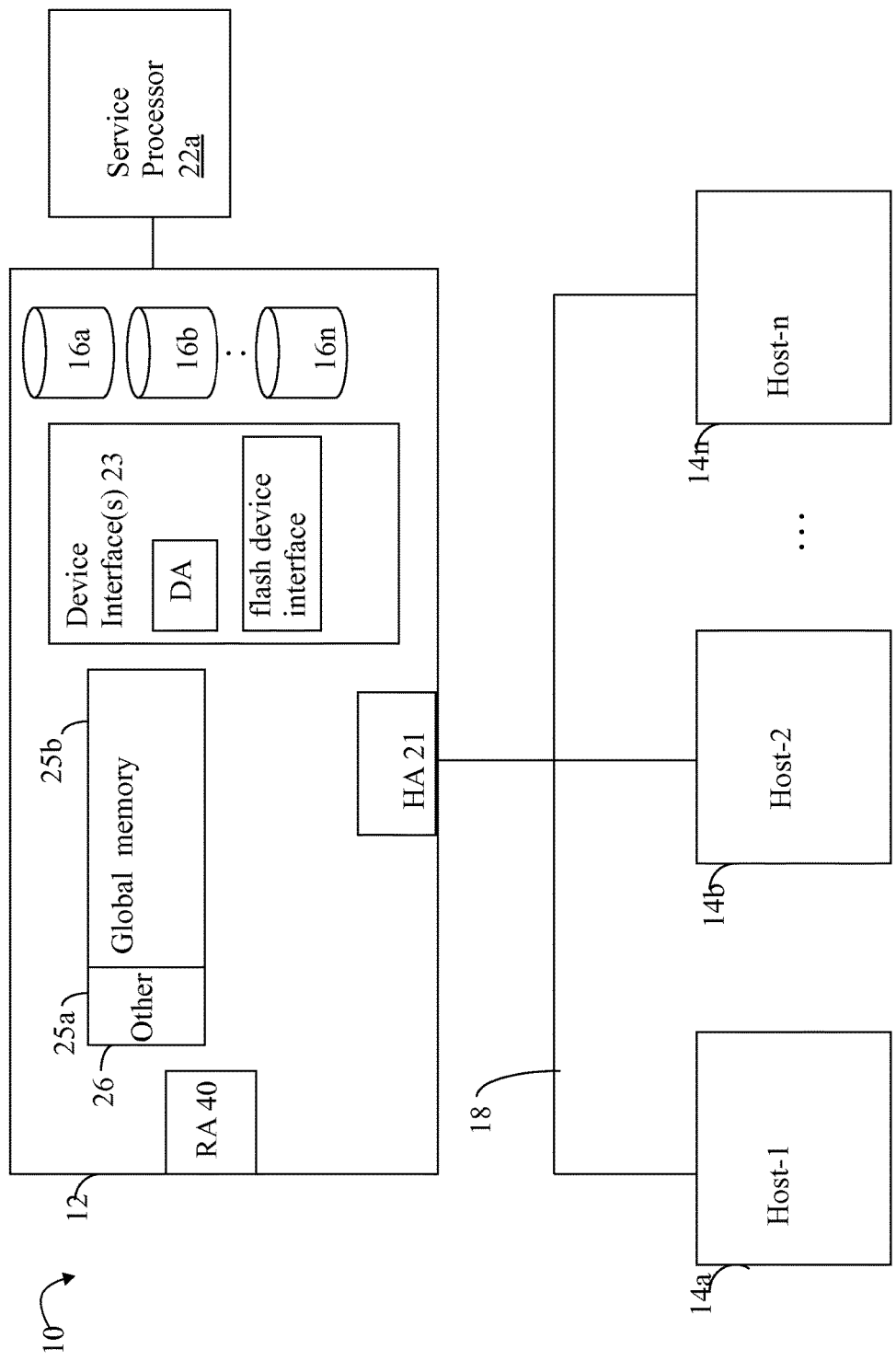
FIG. 1 is an example of an embodiment of a system that may utilize the techniques described herein.

Referring to FIG. 1, shown is an example of an embodiment of a system that may be used in connection with performing the techniques described herein. The system 10 includes a data storage system 12 connected to host systems 14a-14n through communication medium 18. In this embodiment of the system 10, the n hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one or more of a variety of connections as may be provided and supported in accordance with the type of communication medium 18. There may be simultaneous multiple connection medium types. For example one connection medium type may be of a different speed and cost than another. Another example is that one connection medium type may support different standards than another. Another example is that one connection medium type may mostly carry data while another mostly carries control information. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the communication medium may pass through other communication devices, such switching equipment that may exist such as a phone line, a repeater, a multiplexer or even a satellite.

Each of the host computer systems may perform different types of data operations in accordance with different types of tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives or devices and/or one or more other types of physical drives such as any of rotating disk drives, phase-change memory (PCM) devices, hybrid drives, and the like. PCM is also known in the art as PCME, PRAM, PCRAM, Ovonic Unified Memory, Chalcogenide RAM and C-RAM and is a type of non-volatile random-access memory. Hybrid disk drives may include a combination of technologies such as rotating disk drives with RAM, flash-based drives with RAM, and the like. More generally, the techniques herein may also be used with in an embodiment with any suitable type of physical storage device although following paragraphs may make reference to a particular type such as a flash device or flash memory device.

The data storage array may also include different types of adapters, sometimes referred to as directors, such as an HA 21 (host adapter), RA 40 (remote adapter), and/or device interface 23. Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter (FA), Ethernet adapter, or any other suitable adapter which facilitates host communication. The HA 21 may be characterized as a front end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back end components of the data storage system which interface with the physical data storage devices.

An embodiment of a data storage system in accordance with techniques herein may partition functionality of the adapters and/or any other components herein any suitable manner. For example, an embodiment of the data storage system may incorporate functionality performed by one or more types of adapters, such as DAs, into the data storage system without having such DAs be separate physical components of the data storage system.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the storage systems, and the storage systems may also provide data to the host systems also through the channels. The host systems typically do not address the drives or devices 16a-16n of the storage systems directly, but rather access to data may be provided to one or more host systems from what the host systems view as a plurality of logical devices, logical volumes (LVs) which may also referred to herein as logical units. A logical unit may be characterized as a disk array or data storage system reference to an amount of disk space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives or more generally physical storage devices. For example, one or more LUNs may reside on a single physical disk drive, data of a single LUN may reside on multiple different physical devices, and the like. Such data may be stored in any suitable form or format such as in its original form, compressed form, encrypted form, in a form for data deduplication, and the like. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LUN (s) residing thereon. A flash device interface may be another type of device interface used in connection with facilitating data transfers to/from the associated flash devices and LUN(s) residing thereon. It should be noted that an embodiment may use the same or a different device interface for one or more different types of devices than as described herein.

A LUN or more generally logical device exposed to the host may be any one or more logical device types supported in an embodiment. For example, a LUN may be a thick LUN with an exposed storage capacity having all its storage provisioned for such capacity when the LUN is created. A LUN may also be a thin device or virtually provisioned device. A thin device is a type of logical device where units of storage are progressively allocated on an as-needed basis. Typically, the base units of storage are provisioned from multiple sets of PDs organized as RAID groups, where these groups are partitioned into small portions sometimes referred to as slices. There is a mapping provided to relate the logical address in a thin device to the particular slice of provisioned storage. In a system using thin provisioning, the thin devices may appear to a host coupled to a data storage array as one or more logical volumes (logical devices) containing contiguous blocks of data storage. A thin device may be virtually provisioned in terms of its allocated physical storage where physical storage for a thin device (presented to a host as having a particular capacity) is allocated as needed rather than allocate physical storage for the entire thin device capacity upon creation of the thin device. As such, a thin device presented to the host as having a capacity with a corresponding LBA (logical block address) range may have portions of the LBA range for which storage is not allocated. In some embodiments, storage associated with a particular subrange of the logical address space of a thin device (where the subrange may be the size of a slice or chunk allocation unit) may be initially allocated in response to the first time there is write to the logical address subrange. Thin devices and thin provisioning are described in more detail in U.S. patent application Ser. No. 11/726,831, filed Mar. 23, 2007 (U.S. Patent App. Pub. No. 2009/0070541 A1), AUTOMATED INFORMATION LIFE-CYCLE MANAGEMENT WITH THIN PROVISIONING, Yochai, EMS-147US, and U.S. Pat. No. 7,949,637, Issued May 24, 2011, Storage Management for Fine Grained Tiered Storage with Thin Provisioning, to Burke, both of which are incorporated by reference herein.

In an embodiment, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

The device interface, such as a DA, performs I/O operations on a physical device or drive 16a-16n. In the following description, data residing on a LUN may be accessed by the device interface following a data request in connection with I/O operations that other directors originate. For example, a host may issue an I/O operation which is received by the HA 21. The I/O operation may identify a target location from which data is read from, or written to, depending on whether the I/O operation is, respectively, a read or a write operation request. The target location of the received I/O operation may be expressed in terms of a LUN and logical address or offset location (e.g., LBA or logical block address) on the LUN. Processing may be performed on the data storage system to further map the target location of the received I/O operation, expressed in terms of a LUN and logical address or offset location on the LUN, to its corresponding physical device (PD) and location on the PD. The DA which services the particular PD may further perform processing to either read data from, or write data to, the corresponding physical device location for the I/O operation. In some embodiments, the DA on a first data storage system may further expose storage of another second data storage system. A logical device may be exposed to the host whereby the logical device may have its storage provisioned on the second data storage system. The host may issue an I/O operation to the logical device where the DA on the first data storage system may communicate with an FA of the second data storage system to further process the I/O.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Alternatively, an embodiment may provide for collection of such performance data using processor(s) and other components which are internal to the data storage system.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection.

It should be noted that each of the different adapters, such as HA21, DA or disk interface, RA, and the like, may be implemented as a hardware component including, for example, one or more processors, one or more forms of memory, and the like. Code may be stored in one or more of the memories of the component for performing processing described herein in following paragraphs as well other suitable processing.

Figure 2:
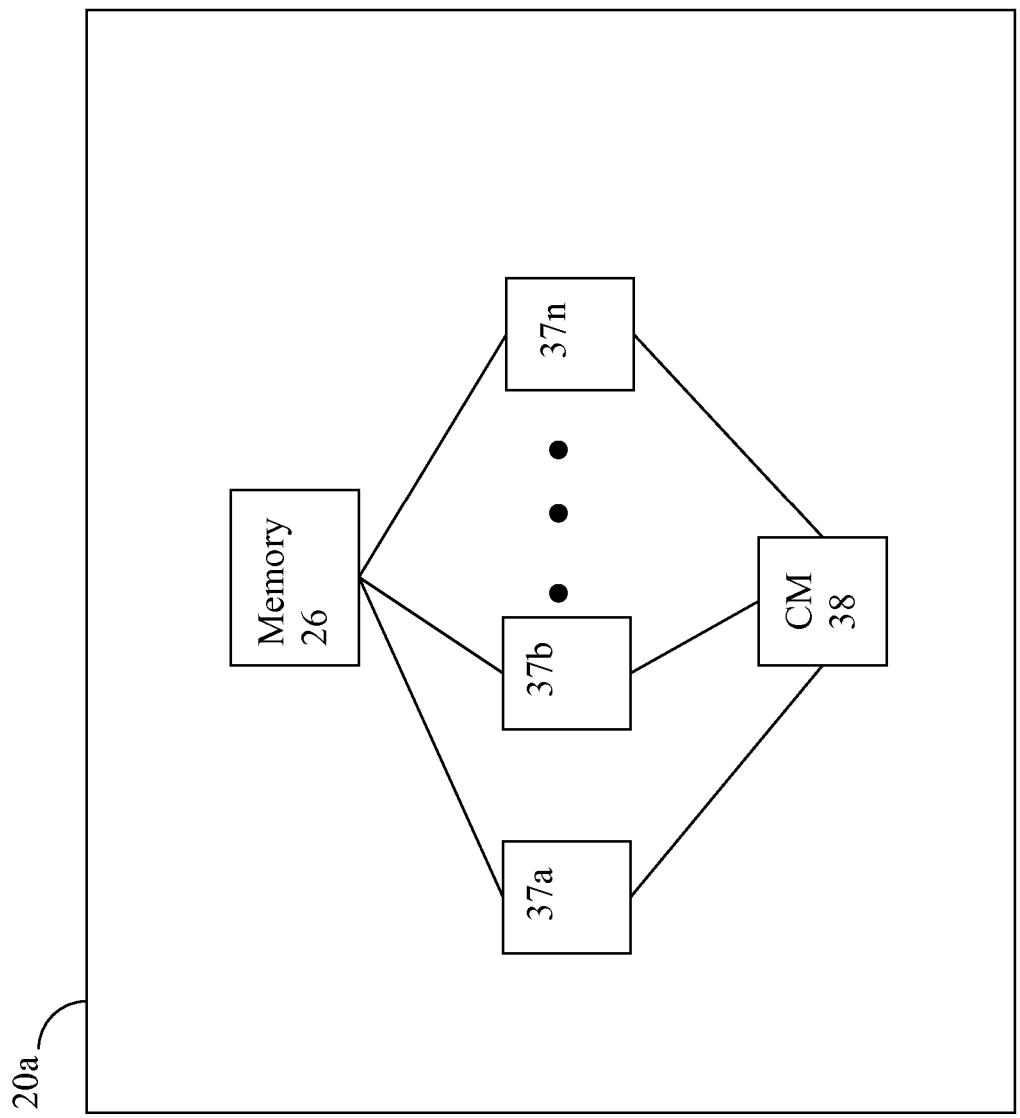
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later de-stage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ or VMAX™ data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various code modules that may execute on the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed.

Figure 3:
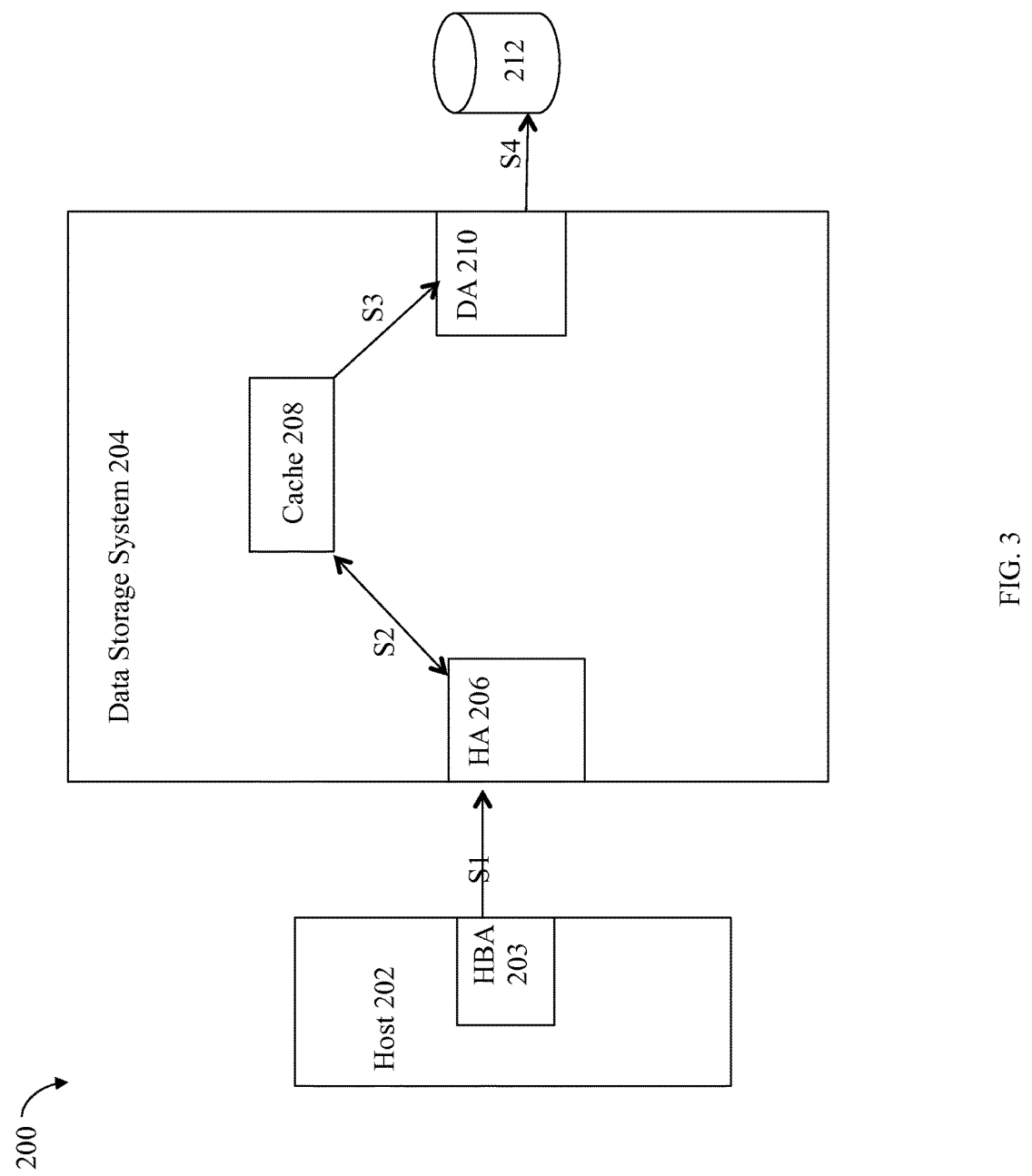
FIGS. 3, 4, 5A, 5B and 9 are examples illustrating performing I/O operations in an embodiment in accordance with techniques herein.

Referring to FIG. 3, shown is an example illustrating processing of a write I/O operation received at the data storage system whereby a host may issue the write operation. The example 200 includes host 202 and data storage system 204. The host 202 includes host bus adapter (HBA) 203 having one or more ports used for communicating with the data storage system 204. The data storage system 204 includes a front end component, HA 206, which receives I/Os from the host 202. The data storage system 204 also includes DA 210, cache 208 and physical storage device 212, such as a disk drive. Generally, the host 202 and data storage system 204 may include components as described in more detail in connection with other figures herein. Details of other components of 202, 204, and connections therebetween, have been omitted for simplicity of illustration. The cache 208 may be a global cache used by and between the different components of the system 204, such as by the HAs, DAs, and other components of the system 204 as described herein. Thus, data in the cache 208 may be read from, and/or written to, by different components of the system 204 such as for use with techniques herein as well as other purposes that may vary with embodiment. In one embodiment such as illustrated in the example 200, the cache 208 may be a portion of global memory of the data storage system 204 whereby cache 208 is used as a data cache for data that is read from and/or written to physical storage such as in connection with I/O operations received from the host 202 at the data storage system 204. In following paragraphs and illustrated in FIG. 3 is processing performed for a write operation.

In step S1, the host 202 may issue a write request over a port of its HBA 203 where the write request is received by the HA 206 of the data storage system 204. In a step S2, the HA 206 may store the write operation data in cache 208 and mark the cache slot or cache location as write pending (WP) thereby denoting the cache slot includes write data that needs to be written to physical storage. In some embodiments, the data storage system may return a response to the host indicating that the write operation has been completed successfully following S2 once the write data has been stored in the cache 208. Once the write data has been stored in cache 208 in step S2, processing may be performed at some time later to destage the write data from cache 208 to the physical drive 212. Thus, in a step S3, the DA 210 may obtain the write data from cache 208 and then store the write data in step S4 at the appropriate location on the physical device 212. Although not described herein and as will be appreciated by those skilled in the art, other processing may be performed in connection with processing the write operation such as, for example, setting the cache slot location to no longer indicate WP once the write data is written to physical storage in step S4.

Figure 4:
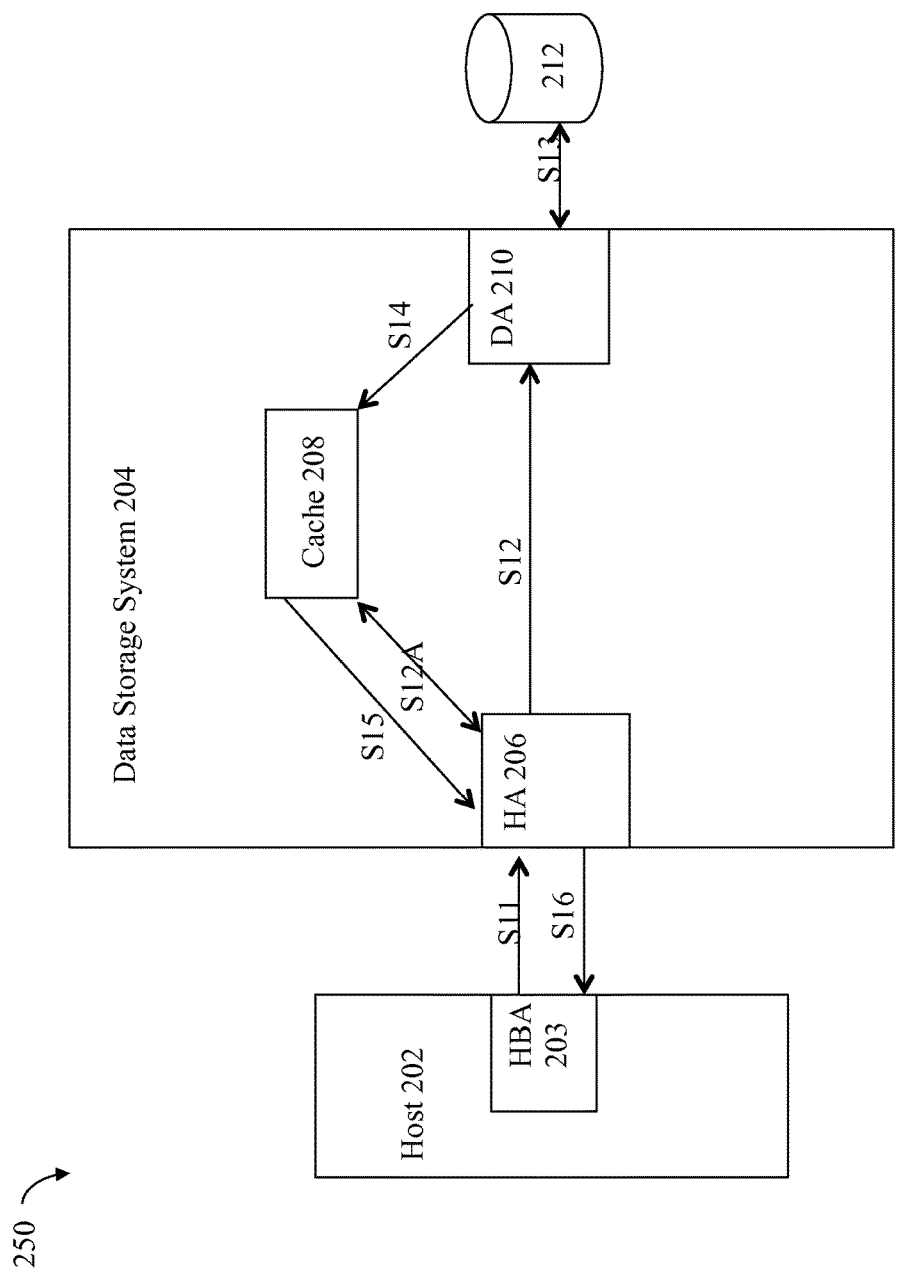

Referring to FIG. 4 shown is an example illustrating processing of a read I/O operation received at the data storage system whereby a host may issue the read operation. The example 250 includes host 202, data storage system 204, and components similarly numbered and as described elsewhere herein.

As a first step S11, the host 202 sends the read request to the data storage system 204. The read request may be received by HA 206. The HA 206 determines whether all the requested read data is in cache 208 thereby indicating that the read request is a read hit, or otherwise, that the read request is a read miss. If the read request is a read hit indicating that the read request may be serviced using data already in cache 208, the HA 206 retrieves the read request data from the cache 208 in step S12A and returns the requested read data to the host 202 in step S16. Alternatively, if the read request is a read miss, processing may be performed to retrieve the data from physical storage, store the requested read data in cache, and then return the cached read data to the host. In connection with read miss processing, the HA 206 may request S12 that a back-end component, such as the DA 210, retrieve the requested data from physical storage device 212. It should be noted that in performing S12, whereby the HA 206 issues the request for the DA 210 to retrieve the requested read data, such a request may be communicated or issued to the DA 210, directly or indirectly, in any suitable manner that may vary with the embodiment of the data storage system. For example, the request may be communicated indirectly, such as through global memory, communicated directly from the HA to the DA such as a through a messaging layer and associated fabric, and the like. In any case, the DA 210 retrieves the requested read data from physical storage device 212 in step S13. The DA 210 may store the read data in cache 208 in step S14. The HA 206 may then retrieve the read data in step S5 from the cache 208 and then return the requested read data (as retrieved from cache) to the host 202 in step S16.

Requests to read and/or write data, such as for I/O operations received by an HA from the host, identify a location of where data is read from or written to, where such location is expressed in terms of a LUN and LUN offset (e.g., LBA or logical block address) in the LUN's logical address space. Data for the LUN and LUN offset is stored at a physical storage location on a physical device (PD). Thus, the LUN and LUN offset may be mapped by the data storage system to a physical device (PD) and location on that PD when reading data from and/or writing data to that LUN and LUN offset. For example, a DA may map the LUN and LUN offset to a corresponding PD and location on the PD.

In connection with performing I/O operations, such as writes as well as reads, a data storage system in an embodiment in accordance with techniques herein may use a cache such as described above in order to improve performance. Data may remain in the data cache an amount of time based on how frequently the data is accessed and also how recently such data has been accessed. For example, LRU (least recently used) is a technique that may be used when determining what data to evict from cache when additional cache storage is needed. With LRU, it is assumed that the most recently accessed data is more likely to be accessed in connection with subsequent I/O operations. As such, the amount of time that has elapsed since cached read data was last accessed may be used in connection with deciding which data to evict from cache. The foregoing is one example of processing that may be performed by a data storage system in an embodiment in accordance with techniques herein. For example, an embodiment in accordance with techniques herein may perform caching techniques such as described in U.S. Pat. No. 7,155,573, issued Dec. 26, 2006, CACHE FALL THROUGH TIME ESTIMATION, Levin-Michael et al., which is incorporated by reference herein, and U.S. Pat. No. 6,715,039, issued Mar. 30, 2004, CACHE SLOT PROMOTION IN A REPLACEMENT QUEUE CACHE USING DETERMINATIONS OF PROBABILITIES AND COSTS, Michael et al., which is incorporated by reference herein.

The data storage environment for the data storage systems 12 may define multiple storage tiers in which each tier includes physical devices or drives of varying technologies. The physical devices of a data storage system, such as a data storage array, may be used to store data for multiple applications. An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD (solid state drive such as a flash drive), a particular type of SSD drive (such using flash or a form of RAM), a type of magnetic rotating disk drive or other non-SSD drive (such as an FC disk drive, a SATA (Serial Advanced Technology Attachment) drive, SAS, NL-SAS), and the like. Data protection may specify a type or level of data storage protection such, for example, as a particular RAID (redundant array of independent disks) level (e.g., RAID-1, RAID-5 3+1, RAID-5 7+1, and the like). Performance characteristics may relate to different performance aspects of the physical storage devices of a particular type or technology. For example, there may be multiple types of FC disk drives based on the RPM characteristics of the FC disk drives (e.g., 10K RPM FC drives and 15K RPM FC drives) and FC disk drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives.

A RAID group and various RAID configurations are known in the art. A RAID group configuration uses multiple physical devices to provide a combination of fault tolerance and/or improved performance for data storage devices. For example, a RAID-5 group includes multiple PDs and provides protection from a single PD failure with block level striping and distributed parity information, and RAID-6 provides protection from two PDs of the RAID group failing with two sets of distributed parity and block level striping. The particular RAID levels described herein are merely exemplary and not a limitation of the techniques described herein.

In an embodiment of a data storage system having multiple storage tiers, techniques may be performed for automated storage tiering and data movement between different storage tier, such as may be performed by a data storage optimizer, to improve data storage system performance. For example, the Fully Automated Storage Tiering (FAST) product produced by EMC Corporation of Hopkinton, Mass., provides such automated movement of data between different storage tiers to optimize use of the different storage tiers including the ability to easily create and apply tiering policies (e.g., allocation policies, data movement policies including promotion and demotion thresholds and policies, and the like) to transparently automate the control, placement, and movement of data within a storage system based on business needs. A data storage optimizer, multi-tiered storage and automated tiering is described, for example, in U.S. Pat. No. 8,583,838, (the '838 patent), Techniques for Statistics Collection in Connection with Data Storage Performance, Nov. 12, 2013, which is incorporated by reference herein. In such a multi-tiered storage environment, each of the different storage tiers may include different PDs having different performance characteristics. For example, a multi-tiered storage system may include a first tier of rotating disk drives and a second tier of flash memory-based PDs. In such an environment where data that is promoted or placed into the second tier, techniques herein may be used to select a particular one PD of the second tier upon which to store the data. In one embodiment, the data storage optimizer may store the most frequently accessed data on the highest/higher performance storage tiers. Since the workload or frequency of access to a particular data portion (e.g., rate of I/Os directed to a data portion) may vary over time, data storage optimizers such as the FAST product may relocate and automatically move data between different storage tiers as the workload directed to the data changes over time. In this manner, a first data portion (e.g., data stored at a particular logical address or LBA on the LUN) that has a high workload at a first point in time may be promoted to a flash storage tier. At a second later point in time, workload directed to the first data portion may greatly decrease so that, relative to other data portions, the first data portion's workload may be very light or low. At this second point in time, the first data portion may be automatically moved by the data storage optimizer to a lower performance storage tier, such as a rotating disk drive tier.

In one embodiment of a data storage system, data prefetching may be implemented when reading data from physical storage. As known in the art, data prefetching may be performed in response to detection of sequential read patterns. A sequential read pattern may be detected, for example, when multiple consecutive read operations result in sequentially reading a set of logically contiguous data. For example a first read operation may read data from LUN X, LBA 1-3 and a second read operation may read data from LUN A, LBA 4-6. Upon receiving the second read operation, a sequential read pattern may be detected. Prefetching may be performed in response to detecting a sequential read pattern since it is likely that such sequential pattern of reading data may continue in subsequent not yet received read operations. In this manner, when retrieving the read data for LUN A, LBA 4-6 of the second read operation, additional data of the sequential pattern may also be prefetched beyond what is currently requested. For example, LUN A, LBA 7-8 may be prefetched even though such data has not been requested for a read operation. Such prefetching may be characterized as a predictive heuristic allowing for prefetching of data from the physical device prior to such data actually being requested. In this manner, the cache may be prepopulated with prefetched data (next expected sequential data in the detected pattern) prior to actually receiving the subsequent read request for the prefetched data in order to increase performance and reduce the response time for servicing requests. Thus, an embodiment in accordance with techniques herein may implement prefetching and may also detect a sequential read. For example, a sequential read pattern may be detected in connection with the read request for data 502 of PD2 and prefetching may be performed, for example, by DA3 using path 520. If prefetching is performed, an embodiment may store the prefetched data, along with the data 502, in cache 304b. The prefetched data may be the next logically sequential data in the detected sequential read pattern (e.g., next logically contiguous data in accordance with the logical addresses or offsets of the LUN).

An embodiment in accordance with techniques herein may implement storage virtualization to further abstract physical storage provided by multiple data storage systems.

In one embodiment in accordance with techniques herein, a storage appliance (also referred to herein as appliance and virtualization appliance) may be a storage virtualization appliance introduced between the hosts and data storage systems whereby the appliance virtualizes presentation of the data storage systems to the hosts. As an example in an embodiment in accordance with techniques herein, the appliance may be implemented using the VPLEX product by EMC Corporation. A product, such as the VPLEX product, may be used to enable the resources of disparate storage systems in dispersed data centers to be federated and/or coordinated and utilized as a single pool of virtual storage. The VPLEX product allows for LUNs provisioned from various storage arrays to be managed through a centralized management interface. Products like the VPLEX product provide for data mobility, availability and collaboration through active/active data over synchronous and asynchronous distances. It is noted that the term "VPLEX" used herein may also generally be understood to refer to and include any appropriate software, hardware, and/or component packages that provide for coordinating and/or federating resources of disparate systems as a single pool of virtual resources, in particular, for example, a single pool of virtual storage.

Rather than presenting storage of the data storage systems directly to the host, such storage is presented to the virtualization appliance. The storage may then be configured using the virtualization appliance and presented to the host through the appliance. Generally, any physical storage may be presented to the appliance which is then virtualized and abstracted into configured logical devices presented to the hosts.

In an embodiment in accordance with techniques herein, the host thus issues I/Os directed to a LUN to the appliance. In turn, the appliance directs each of the I/Os to one or more of the data storage systems providing the physical storage for the LUN. In such an embodiment, the appliance is included in the I/O path. In some embodiments depending on how the LUN's physical storage is configured, the appliance may have a choice as to which data storage system(s) to send an I/O operation, such as a read operation requesting to read data from the LUN, and the appliance may send a write operation requesting to write data to the LUN to multiple data storage systems. For example, the LUN may be configured so that its data is mirrored or replicated across multiple data storage systems whereby a first copy of the LUN's data is on PDs of a first data storage system and a second copy of the LUN's data is on PDs of a second data storage system different from the first data storage system. The LUN may be configured, for example, using RAID-1. As another example, the LUN may be configured using another RAID configuration and level, such as RAID-5, whereby a first copy of the LUN's data is stored in a RAID-5 group configuration provided by a first data storage system and a second copy of the LUN's data is stored in a RAID-5 group configuration provided by a second different data storage system.

It should be noted that the appliance may be generally characterized as a component in the I/O path that may partition or split the I/O path at a point into multiple directions, such as sending the I/O operation to one of several possible data storage systems for servicing, thereby extending the I/O path to include such multiple directions. Thus, appliance is one example of a component that may be used in an embodiment in accordance with techniques herein whereby such a component may partition or split the I/O path at a point by selecting one or more possible alternative paths along with the I/O is sent. Depending on the particular embodiment, the component may be any suitable component that forwards the I/O to one or more other components.

Figure 5A:
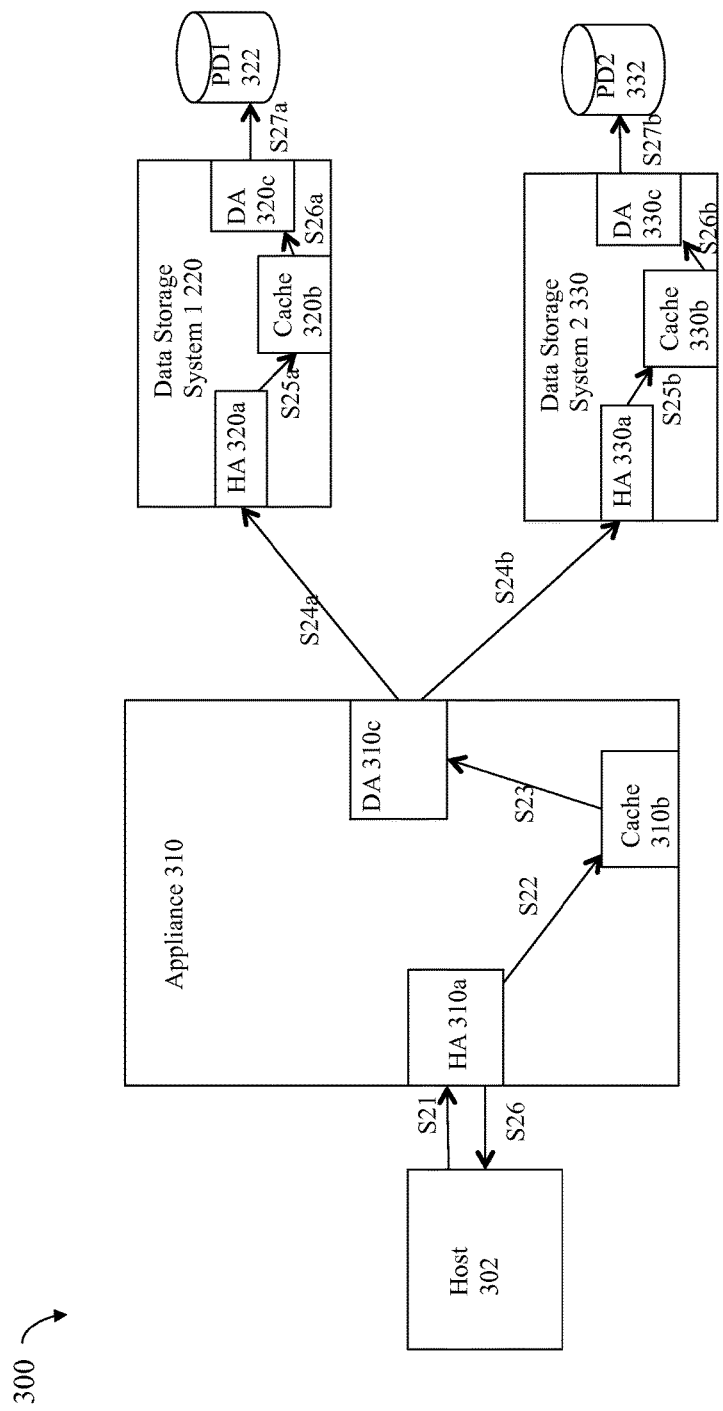

Referring to FIG. 5A, shown is an example 300 of components that may be included in a system in accordance with techniques herein. The example 300 includes a host 302, appliance 310 and data storage systems 220, 230. It should be noted that only a single host and only two data storage systems are illustrated for simplicity. More generally, there may be multiple hosts and any number of data storage systems or other components providing physical storage being virtualized by the appliance 310. The example 300 also contains arrows illustrating processing flow of the I/O path for a write operation as will be described in following paragraphs.

The appliance 310 may be a virtualization appliance as mentioned above. Generally, the appliance 310 may include multiple directors and/or components as described herein in a data storage system. For example, the appliance 310 may include such as HAs, DAs, a data cache, and the like. As illustrated the application 310 includes HA 310a, DA 310c and data cache 310b. Data storage system 1 (DS1) 220 includes HA 320a, DA 320c, data cache 320b, and PD1 322. Data storage system 2 (DS2) 320 includes HA 330a, DA 330c, data cache 330b, and PD2 333. As will be appreciated by those skilled in the art, appliance 310 and data storage systems 220, 330 are illustrated herein with a reduced number of components, such as a single DA and single HA, for simplicity of illustration.

In following examples, reference may be made to a LUN configured as a RAID-1 logical device. With a LUN configured as a RAID-1 logical device, data for the LUN is mirrored. Storage for the LUN may be provisioned from a RAID-1 group including two PDs where data stored on a first of the PDs is mirrored on a second of the PDs. In connection with the system of FIG. 5A, the mirroring may be performed by the appliance with respect to 2 PDs each located on a different storage system such as DS1 and DS2. For example, the LUN may be configured to have a first copy of its data stored on PD1 322 and the second copy or mirror of its data stored on PD2 332.

When a write is received by the appliance 310 from the host 302 to write data to the LUN, the data may be written to both PDs 322, 332. The appliance 310 knows that the LUN is configured to have its data mirrored in a RAID-1 configuration where the first PD is on DS1 and second PD is on DS2. In response to receiving the write, the appliance 310 writes the data to the first PD by sending the write to DS1 220 and also writes the data to the second PD 332 by sending the write to DS2 330.

As illustrated in the example 300 in more detail, the host 302 may issue S21 a write operation to write data to the LUN. The write operation and associated write data may be received by HA 310a which stores S22 the write data in a data cache 310b of the appliance. The DA 310c obtains S23 the write data from the cache 310b and forwards S24a the write operation to DS1 220 and also forwards S24b the write operation to DS2 330. Each of DS1 220 and DS2 330 may perform processing of the write operation as described above in connection with FIG. 3 and as illustrated in FIG. 5A. On DS1 220, the write data is received by 320a, stored S25a in data cache 320b, obtained S26a from cache 320b by DA 320c which writes S27a the write data out to PD1 322. On DS2 330, the write data is received by 330a, stored S25b in data cache 330b, obtained S26b from cache 330b by DA 330c which writes S27b the write data out to PD2 332.

At some point, the completion of the write is acknowledged by sending S40 and acknowledgement to the host 302. Such an acknowledgement may be sent, for example, after the write data has been written to cache 310b, after the write data has been stored in the caches 320b, 330b, and the like, as may vary with embodiment.

Figure 5B:
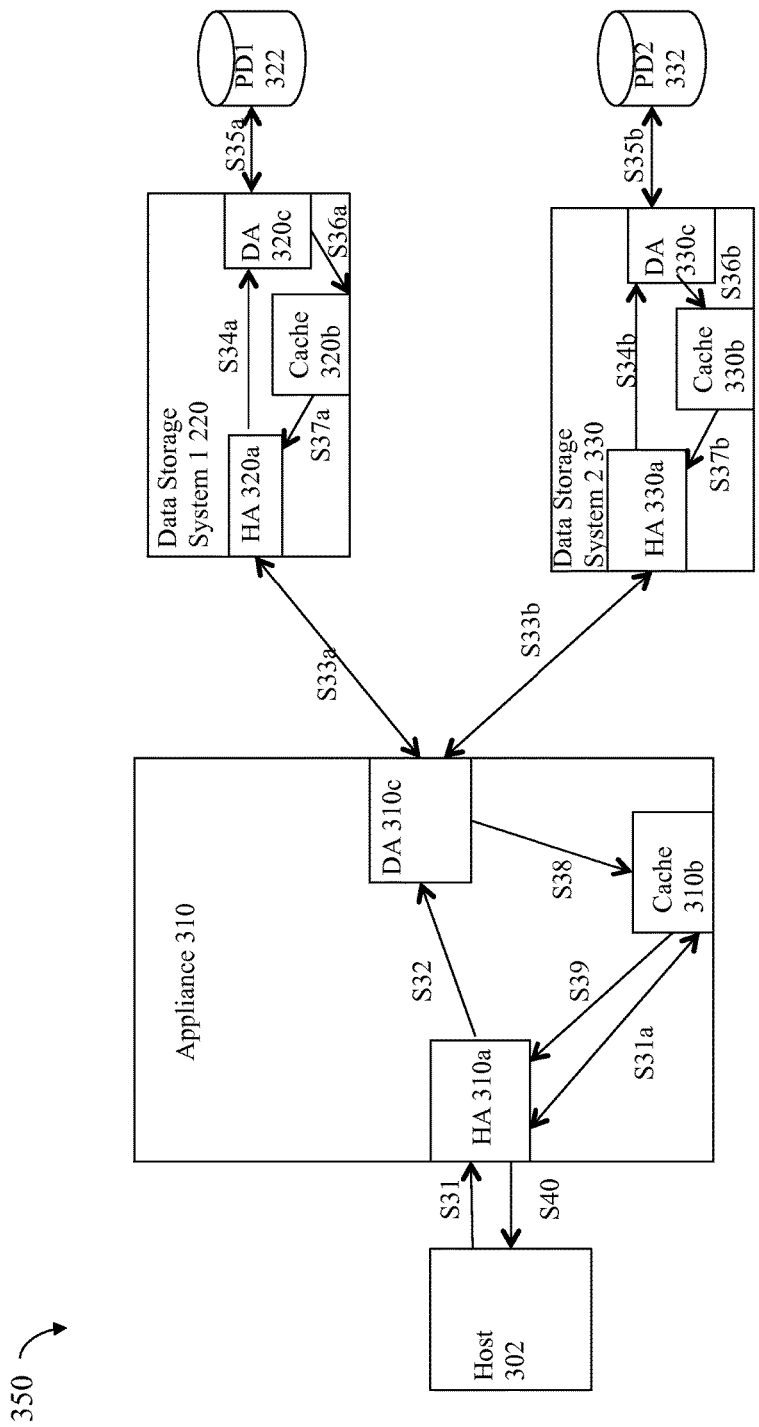

With reference to FIG. 5B, shown is an example 350 of components that may be included in a system in accordance with techniques herein. The example 350 includes the same components as illustrated in FIG. 5A but FIG. 5B also contains arrows illustrating processing flow of the I/O path for a read operation.

When the appliance receives a read operation from the host to read data from the LUN and the read data is not in the appliance's cache 310b, the read may be serviced by reading the data from a PD of either DS1 220 or DS2 330. More generally, in connection with servicing the read directed to the LUN, the appliance may have a choice as to which one or more data storage systems to direct the read. As will be described in more detail below, the appliance 310 in embodiments in accordance with techniques herein may issue the read to a single one of DS1 220 and DS2 330, or may issue the read to both DS1 220 and DS2 330.

As illustrated in the example 350 in more detail, the host 302 may issue S31 a read operation to read data from the LUN. The read operation may be received by HA 310a. In a manner similar to that as described in connection with FIG. 4 for a data storage system, processing is first performed to determine whether the requested read data is in the cache 310b. If so, there is a read hit and the read data is obtained S31a from the cache 310b and returned S40 to the host. Otherwise, if the requested read data is not currently stored in the cache 310b of the appliance 310, there is a read miss and the read request is sent S32 to the DA 310c. As noted above and elsewhere herein, the read request may be sent to one or both of the DS1 220 and DS 330.

When the read operation is sent S33a to DS1 220, the read operation is received by HA 320a. DS1 220 performs processing of the read operation as described above in connection with FIG. 4 and as illustrated in FIG. 5B. On DS1 220, a determination is made as to whether the requested read data is in cache 320b and if so, the read data is retrieved from 320b and sent S37a to HA 320a which then returns the read data to the appliance 310. If the read data is not in cache 320b, the read operation is sent S34a to the DA 320c which retrieves S35a the read data from PD1 322 and stores S36a the read data in the cache 320b. The read data is then retrieved S37a from the cache 330a and sent to the HA 320a where HA 320a then returns the read data to the appliance 310a.

When the read operation is sent S33b to DS2 330, the read operation is received by HA 330a. DS3 330 performs processing of the read operation as described above in connection with FIG. 4 and as illustrated in FIG. 5B. On DS2 330, a determination is made as to whether the requested read data is in cache 330b and if so, the read data is retrieved from 330b and sent S37b to HA 320b which then returns the read data to the appliance 310. If the read data is not in cache 330b, the read operation is sent S34b to the DA 330c which retrieves S35b the read data from PD2 332 and stores S36b the read data in the cache 330b. The read data is then retrieved S373 from the cache 330b and sent to the HA 320b where HA 320b then returns the read data to the appliance 310a.

The appliance 310 receives the read data from one or both of DS1 220 and DS2 330 where the read data is stored S38 in the cache 310b, returned S39 from the cache 310b to HA 310a, and then returned S40 to the host 302.

In an embodiment not using techniques herein, the appliance may service the read based on a load balancing technique such as round robin which may alternate between DS1 220 and DS2 330 for servicing a series of reads directed to the LUN. For example, in a series of read operation received in an order of R1, R2, R3, R4, R5, and R6, the appliance may send R1, R3 and R5 to DS and may send R2, R4 and R6 to DS2.

However, using the round robin technique, the appliance does not consider that better performance may be obtained by forwarding all such reads to a single one of the storage systems. In this manner, an embodiment in accordance with techniques herein may take into consideration one or more criteria related to DS1 and DS2. Such criteria may include information describing how DS1 and DS2 are actually configured (e.g., take into account various configuration options currently installed on each of DS1 and DS2). Such configuration options of the data storage systems as denoted by the criteria may affect I/O performance on the data storage systems.

If the appliance is aware of the different configuration options of DS1 and DS2, the appliance may make a decision regarding which of DS1 or DS2 services reads for the LUN taking into account such configuration options of DS1 and DS2. More generally, the appliance may make a decision regarding which of DS1 and DS2 services a read operation in accordance with one or more criteria. The one or more criteria may include information regarding the current configuration of DS1 and DS2. Such criteria may also be characterized as identifying configuration aspects of the data storage systems relating to side effects on the individual data storage systems DS1 and DS2 that may impact performance of subsequent I/O operations.

Generally, optimizations such as, for example, to caching, sequential read pattern detection and prefetching may have read side effects impacting subsequent read performance. Other optimizations, such as data movement optimizations described herein, may generally impact performance of subsequent I/Os.

For example, each of DS1 and DS2 may perform data caching, pre-fetching, and perform data storage optimizations which store the most frequently accessed data on faster or better performing PDs (each DS1 and DS2 may have a data storage optimizer such as the FAST product which automatically relocates data portions among the different storage tiers based on workload directed to each of the data portions) and the like. Techniques described herein take into account such criteria describing the configuration of DS1 and DS2 when deciding where to direct received I/Os.

For example, consider the case where each of DS1 and DS2 are configured as described herein to cache data and evict cached read data based on LRU, and also perform data storage optimizations such as by the FAST product. Based on the foregoing, it may be beneficial in terms of performance to direct all reads for the LUN to a single one of DS1 and DS2 rather than send subsequent reads to alternating ones of DS1 and then DS2.

Figure 5C:
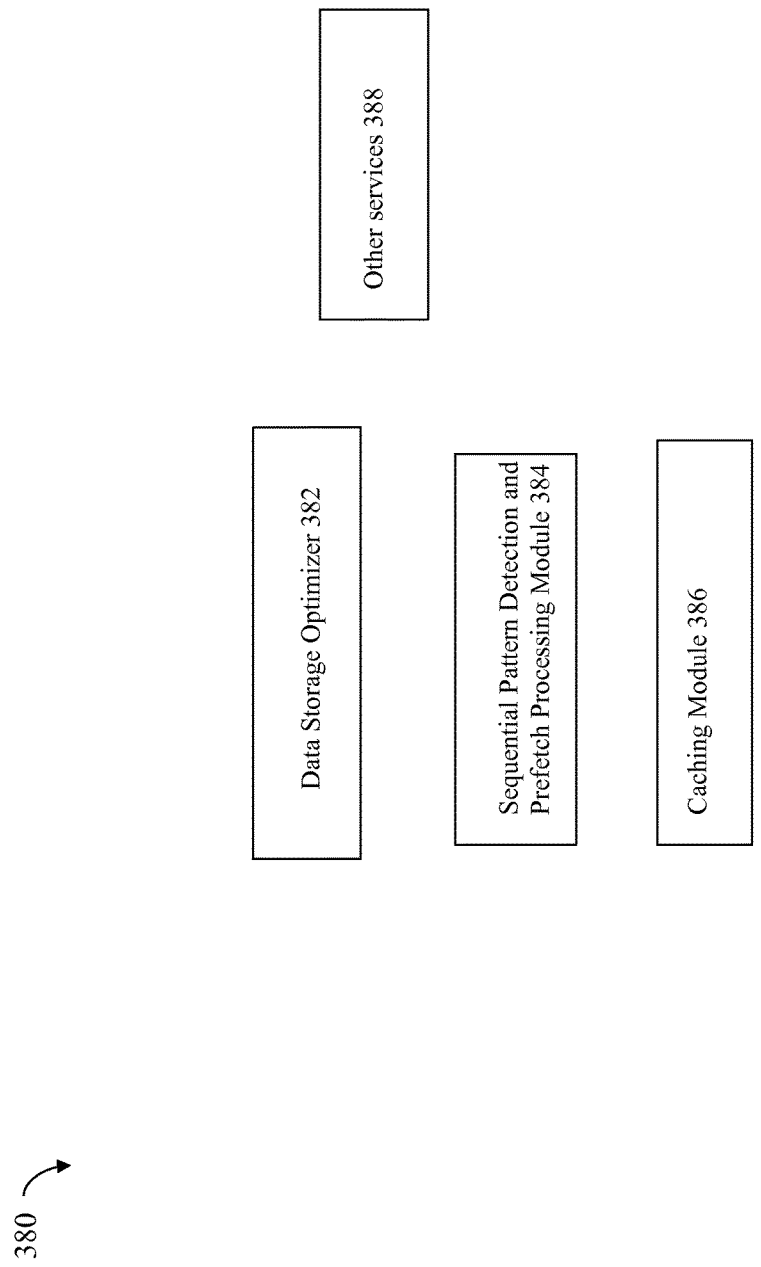
FIG. 5C is an example of different configuration options that may be included in a data storage system in an embodiment in accordance with techniques herein.

With reference to FIG. 5C, shown is an example 380 of components that may be additionally included in each of the data storage systems DS1 220 and DS2 330 of FIGS. 5A and 5B in an embodiment in accordance with techniques herein. Each data storage system 220, 330 may include a data storage optimizer 382, sequential pattern detection and prefetch processing module 384, caching 386, and optionally other services 388. The data storage optimizer 382 may be, for example, the FAST product by EMC Corporation described elsewhere herein, that performs automated movement of data between storage tiers based on I/O workloads of the different data portions. For example, the data storage optimizer 382 may store the most frequently accessed data on faster or better performing PDs. The sequential pattern detection and prefetch processing module 384 may perform prefetch processing responsive to detection of a sequential read pattern such as described elsewhere herein. The caching module 386 may perform processing for management of the data cache of the data storage system such as described elsewhere herein. Element 388 may generally represent other optional services that may be performed by the data storage system.

As described in more detail in following paragraphs, one or more criteria may denote aspects regarding the configuration of DS1 220 and DS2 330 such as regarding the components 380 of FIG. 5C that may installed and used be each such system.

It should be noted that the appliance 310 may not perform other services besides caching as described above. In other words, in at least one embodiment described herein, the appliance 310 may not include the data storage optimizer 382 and prefetching module 384 but may include a caching module 386.

It should also be noted that techniques herein may be performed with respect to selected LUNs. Similarly, processing of particular modules, optimizations, services, and the like, performed by configured modules of a data storage system may be selectively enabled or disabled for each LUN, or portions thereof, depending on supported granularity in an embodiment. For example, for each LUN, data storage optimizations performed by module 382 may be enabled or disabled, and sequential pattern detection and prefetch processing performed by module 384 may be enabled or disabled, and the like. In an embodiment in accordance with techniques herein, some level of data caching may always be performed by module 386.

With respect to caching as implemented by caching module 386 on each of DS1 220 and DS2 330, as noted above, there are advantages in directing all reads of the LUN, or a large portion of consecutively received reads directed to the LUN, to the same data storage system. If multiple read operations directed to the LUN read the same data multiple times, the first such read may result in the read data being placed in cache initially where subsequent reads of the same data result in a read hit. In contrast, if the reads directed to the LUN were sent in an alternating manner as noted above with round robin, such subsequent reads may not result in read hits depending on whether the read data was ever placed into the cache and whether the read data has been evicted from cache.

Figure 6:
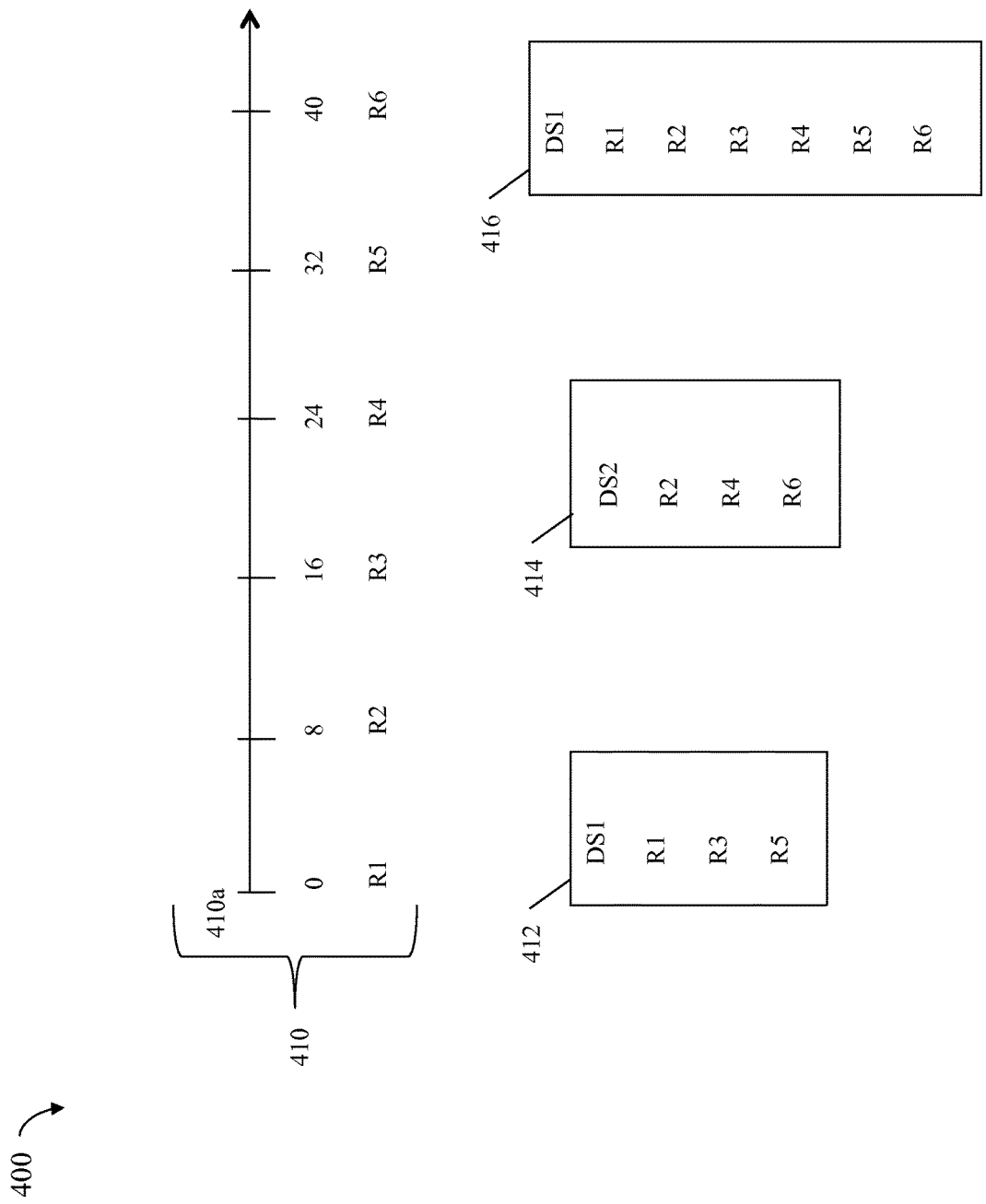
FIGS. 6 and 7 are examples illustrating use of techniques herein in connection with a sequence of read operations.

For example, reference is made to FIG. 6. In the example 400, element 410 represents a series of 6 reads R1-R6 directed to the same data portion of a LUN (e.g. directed to the same LBA subrange of the logical address range of the LUN). As illustrated by 410, the reads R1-R6 may be received by the appliance 310 at different points in time, relative to when the first read R1 is received, over a time span of 40 minutes. Element 410a is a time axis identifying when each of the reads R1-R6 is received. As illustrated by 410, 6 reads R1-R6 may be received in order R1-R6 where the next read is received about 8 minutes after the immediately prior read. Read R1 is received at time=0 minutes, read R2 is received at time=8 minutes, read R3 is received at 16 minutes, read R4 is received at time=24 minutes, read R5 is received at time=32 minutes and read R6 is received at time=40 minutes. For purposes of illustration, assume that the times denoted on 410a also apply to the relative times at which the reads are also received by any of DS1 and DS2 if forwarded by the appliance.

Additionally, consider the case where the cache is implemented with an LRU-based cache eviction technique such as described elsewhere herein. Data that is read for the first time results in a cache miss or read miss and the read data is retrieved from physical storage and then stored in cache. Caching techniques may store data in cache for a specified amount of time T1 (e.g., also referred to as expected lifetime in cache or fall through time). It should be noted that in some embodiment, the amount of time T1 may vary over time and may vary with the particular techniques implemented. After time T1 elapses and assuming that the data portion is not read again prior to time T1 elapsing, the data portion is a candidate for eviction from cache whereby the data portion may be evicted from cache as new cache locations are needed. If the data portion is evicted from cache, the next read results in a read miss.

However, if the data portion currently stored in cache is read again before time T1 elapses or prior to the data portion being evicted from cache, the read results in a read hit and the data portion may remain in cache for another amount of time T1.

Using the alternating round robin technique, 412 may represent that DS1 receives R1, R3 and R5 and 414 may represent that DS2 receives R2, R4 and R6. For illustration, assume the DS1 and DS2 implement a caching technique that stores a read data portion in cache T1=10 minutes. The data remains in cache for the initial 10 minutes. After 10 minutes has elapsed since the read data was stored in cache, the read data may be evicted from cache if not accessed again prior to the 10 minute time period elapsing. For purposes of illustration, assume that the read data is evicted from cache if not accessed again within the 10 minute time period. Based on the foregoing, the series of reads 412 directed to DS1 result in 3 read misses and the series of reads 414 directed to DS2 results in 3 read misses. As another example of an embodiment not using techniques herein, if the time T1 is 16 minutes (whereby each DS1 and DS2 keep a data item in cache for 16 minutes and then may evict the data item if not accessed again within the 16 minute time period), the result would be that both DS1 and DS2 would keep the read data in their respective caches (e.g., R3-R6 resulting in cache hits). However, the foregoing may also be characterized as inefficient use of cache since the read data is stored in both data caches of DS1 and DS2 as opposed to only a single data cache of either DS1 or DS2 as described below in an embodiment in accordance with techniques herein.

Now, assume that techniques described herein are utilized where the appliance is aware of the caching techniques of DS1 and DS2 via the one or more criteria. For example, the appliance may use criteria indicating that both DS1 and DS2 perform data caching and implement an LRU-based cache eviction technique where a first data portion last accessed X minutes ago remains in cache longer that a second data portion last accessed Y minutes ago, where Y>X (e.g., most recently accessed data remains in cache longer than other data not as recently accessed). The criteria may also denote the current lifetime of a cached data item denoting T1 how long the cached data may be expected to remain in cache unless re-referenced. Assume as above that the read data remains in cache 10 minutes after which the read data is evicted unless referenced prior to the 10 minute time period elapsing. If the read data is referenced within the 10 minute time period, the read data may remain in the cache for another amount of time, such as at least another 10 minutes. The foregoing may be repeated whereby each time the read data is referenced, it remains in the cache for an additional amount of time. Based on the foregoing criteria, the appliance may direct the 6 reads R1-R6 to the same data storage system, such as direct all 6 reads R1-R6 to DS1 as illustrated by 416. In this case, the first read R1 may result in a read miss. However, the next 5 reads result in read hits. With R2, the read data is accessed again at time T=8 minutes prior to the 10 minute time period elapsing. Thus, R2 results in a read hit and the read data remains in cache for at least another 10 minute time period that may be longer if the read data is again referenced. In this case, the read data is again referenced in R3 and results in another read hit. The foregoing is repeated whereby with each reference to the read data, the read data is found in cache resulting in a read hit and additionally, the time that the read data remains in cache is extended another 10 minutes relative to when the last access occurs.

The foregoing is an example illustrating how techniques herein may result in better performance for servicing the reads by sending all reads R1-R6 to the same DS1 whereby the appliance makes such a decision in accordance with criteria indicating the current configuration of DS1 and DS2 as performing data caching, and more particularly, LRU-based caching or caching techniques whereby the least recently used cached data is a candidate for eviction prior to other cached data that is more recently accessed.

With respect to sequential reads, there are advantages in directing all reads of the LUN to the same data storage system. For example, if the reads R1-R6 are sequential, sending all reads to just DS1 allows DS1 to detect the sequential read pattern and prefetch data stored in cache based on the detected sequential read pattern.

Alternatively, if the reads directed to the LUN were sent in an alternating manner as noted above with round robin, DS1 may not detect the sequential read pattern and may not prefetch data based on the sequential read pattern.

Figure 7:
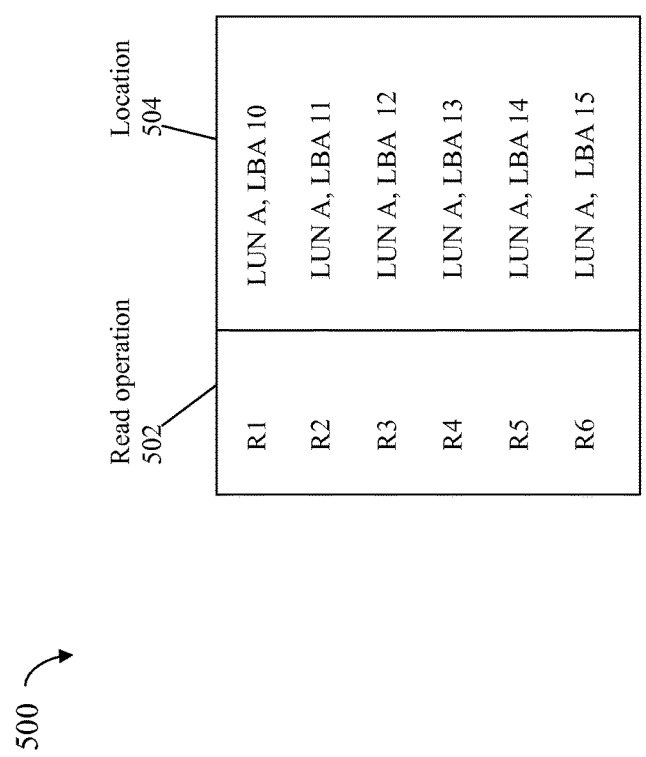

To further illustrate reference is made to FIG. 7. The example 500 includes more detail regarding the 6 read operations consecutively received by the appliance. The table of 500 includes a column 502 identifying the read operations and a column 504 of the locations on the LUN A from which data is read. As can be seen, the example 500 illustrates 6 consecutive reads which are logically sequential in that they sequentially access data of LUN A beginning with offset or LBA 10 and ending with offset or LBA 15. Assume that DS1 and DS2 implement sequential read pattern recognition and perform prefetching responsive to detecting a sequential read pattern. Also, assume that both DS1 and DS2 execute code that detects a sequential pattern after receiving 3 sequential reads. Thus, if R1-R3 are sent to DS1, DS1 detects a sequential read pattern and performs prefetching to prefetch (e.g., read from physical storage and store in cache) one or more subsequent data portions of the detected sequential stream. Responsive to detecting the sequential stream, DS1 may also prefetch the next one or more blocks of data, such as from LUN A, LBA 13 and 14, prior to DS1 receiving R4 and R5. When R4 and R5 are then received at DS1, R4 and R5 both result in cache hits and the reads are both serviced using cached data. Additionally, DS1 may also then prefetch LUN A, LBA 15 whereby R6 also results in a cache hit.

As noted above, in an embodiment not using techniques herein where R1-R6 are sent to both DS1 and DS2 in an alternating manner as noted above with round robin, DS1 may not detect the sequential read pattern and may not prefetch data based on the sequential read pattern. In such a case, DS1 receives R1, R3 and R5 at LBAs 10, 12 and 14 of LUN A, where a sequential pattern of data is not detected and there is no prefetching performed. Similarly, DS2 receives R2, R4 and R6 at LBAs 11, 13 and 15 of LUN A, where a sequential pattern of data is also not detected and there is no prefetching performed. As another possibility of an embodiment not using techniques herein, the appliance not using techniques herein may randomly select one of DS1 and DS2 to receive each of the reads R1-R6. For illustration, assume that R1-R3 are directed to DS1 based on random selection and R4-R6 are directed to DS2 based on random selection. In this case, DS1 and DS2 would both detect sequential patterns and both perform prefetching. DS1 may prefetch, for example, data for LBA 13 and 14 as described above. However, the benefit of the prefetched data is never realized since subsequent reads R4-R6 are directed to DS2.

Thus, a benefit can be realized in terms of performance utilizing techniques herein if all such reads R1-R6 are directed to the same data storage system such as DS1 whereby the appliance makes such a decision in accordance with criteria indicating the current configurations of DS1 and DS2 as implementing caching, sequential read pattern detection and prefetching. Such criteria may provide more detailed information such as any one or more of the average lifetime of a cached data item, the rules for sequential pattern recognition (e.g., how many sequential reads trigger detection of a sequential read pattern), rules for prefetching (e.g., how much data is prefetched), and the like.

In connection with data storage optimization, each of DS1 and DS2 may include a data storage optimizer 382, such as the FAST product described herein, which automatically moves data between the different storage tiers based on the workload directed to different data portions. Such a data storage optimizer may calculate various metrics or statistics based on received I/Os directed to a data portion to estimate the workload directed to a data portion at a point in time. The data storage optimizer may determine which storage tier to place a data portion in based on the I/O workload observed.

As a first case consider an embodiment not using techniques herein where the reads directed to the LUN are sent in an alternating manner as noted above with round robin (e.g., R1-R3 to DS1 and R4-R6 to DS2 where all 6 reads read the same data portion). Assume that the I/O workload directed to the data portion for the 6 reads is represented as W1. Splitting the reads between DS1 and DS2 results in both DS1 and DS2 observing the I/O workload of the data portion to be half of W1 by both DS1 and DS2. In this case, the data portion's workload of 0.50*W1 may not be a high enough workload to result in the data storage optimizer placing the data portion in the flash storage tier. Thus, the data storage optimizers of both DS1 and DS2 may place the data portion in a lower performance storage tier other than the flash storage tier. Alternatively, the workload of 50% W1 for the data portion observed by both DS1 and DS2 may be sufficiently high enough to result in both DS1 and DS2 storing the data portion in flash storage.

In contrast, an embodiment in accordance with techniques herein may have the appliance send all reads to the same data storage system such as DS1. If all reads are sent to the same data storage system and such reads are directed to the same data portion, that data portion may be characterized as having a high I/O workload W1 whereby the data portion may be promoted to the flash storage tier. In an embodiment in accordance with techniques herein, the high workload W1 for the data portion may be observed by DS1 whereby the data portion may be stored on flash of a single data storage system DS1 as opposed to the above without techniques herein (e.g., where the data portion may not be stored on flash storage at all resulting in lower performance than with techniques herein, or where the data portion may be stored on flash storage of both DS1 and DS2 thereby needlessly consuming flash storage of both data storage systems as opposed to only storing the data portion on flash storage of a single data storage system).

Thus, a benefit can be realized in terms of performance utilizing techniques herein if all such reads R1-R6 are directed to the same data storage system such as DS1 whereby the appliance makes such a decision in accordance with criteria indicating the current configurations of DS1 and DS2 as implementing tiered storage and using a data storage optimizer 382, such as the FAST product, which performs automated movement of data portions between storage tiers based on I/O workloads directed to the different data portions.

In one embodiment, the appliance may have knowledge, in the form of one or more criteria, regarding characteristics of algorithms implemented on each of the data storage systems. For example, the appliance may receive one or more criteria denoting that each of the data storage systems performs optimizations based on locality of reference even without knowing whether the data storage systems implement such techniques with respect to caching, sequential pattern recognition and caching.

Locality of reference is generally known to those of ordinary skill in the art as describing the same or related storage locations being frequently accessed. Temporal locality refers to the reuse of specific data, and/or resources, within a relatively small time duration. Spatial locality refers to the use of data elements within relatively close storage locations (e.g., locations of a LUN's address space logically adjacent or near one another). Sequential locality, a special case of spatial locality, occurs when data elements are arranged and accessed linearly, such as, traversing the elements in a one-dimensional array. Locality is merely one type of predictable behavior that occurs in computer systems. Systems that exhibit strong locality of reference are great candidates for performance optimization through the use of techniques such as the cache and data prefetching as described herein.

Based on criteria denoting that DS1 and DS2 implement techniques based on locality of reference, the appliance may make a decision to direct all reads for the LUN to a single one of the data storage systems, such as DS1 or DS2, as described herein.

An embodiment in accordance with techniques herein may also use one or more criteria providing more detailed information regarding the configuration and techniques used in DS1 and DS2. For example, the one or more criteria may provide more information regarding DS1 and DS2 besides the general indicator of locality of reference algorithms being utilized. For example, the one or more criteria may identify the facilities and/or services which perform locality of reference optimizations. For example, the criteria may indicate that data caching is performed using locality of reference optimizations. More specifically, the criteria may indicate that frequency of reference of a data portion affects how long it remains in cache (e.g., least recently used or referenced read data may be evicted first), that sequential read pattern recognition is performed and that prefetching is performed responsive to detecting a sequential read pattern. Additionally, the criteria may indicate that the data storage systems DS1 and DS2 perform data storage movement optimizations whereby data portions are automatically relocated between different storage tiers based on varying I/O workloads of the data portions over time (e.g. with data portions having the highest/higher I/O workloads on the highest/higher performance storage tiers).

In an embodiment in accordance with techniques herein, the one or more criteria used by the appliance may be provided in any suitable form. For example, the criteria may be expressed as configuration information regarding the data storage systems for which the appliance is virtualizing the physical storage (e.g., the data storage systems to which the appliance can forward such read operations where the data storage systems provide provisioned physical storage for LUNs presented by the appliance to the hosts or other consumers of the LUN).

The appliance may use the criteria described herein regarding DS1 and DS2 to decide which data storage system to direct I/Os for each LUN. In this manner, if there are N LUNs configured to have mirroring where the LUN has a first copy of its data on PDs of DS1 and a second mirror copy of its data on PDs of DS2, the appliance may direct all reads for N/2 of the LUNs to DS1 and all reads for the remaining ones of the N LUNs to DS2.

Figure 8:
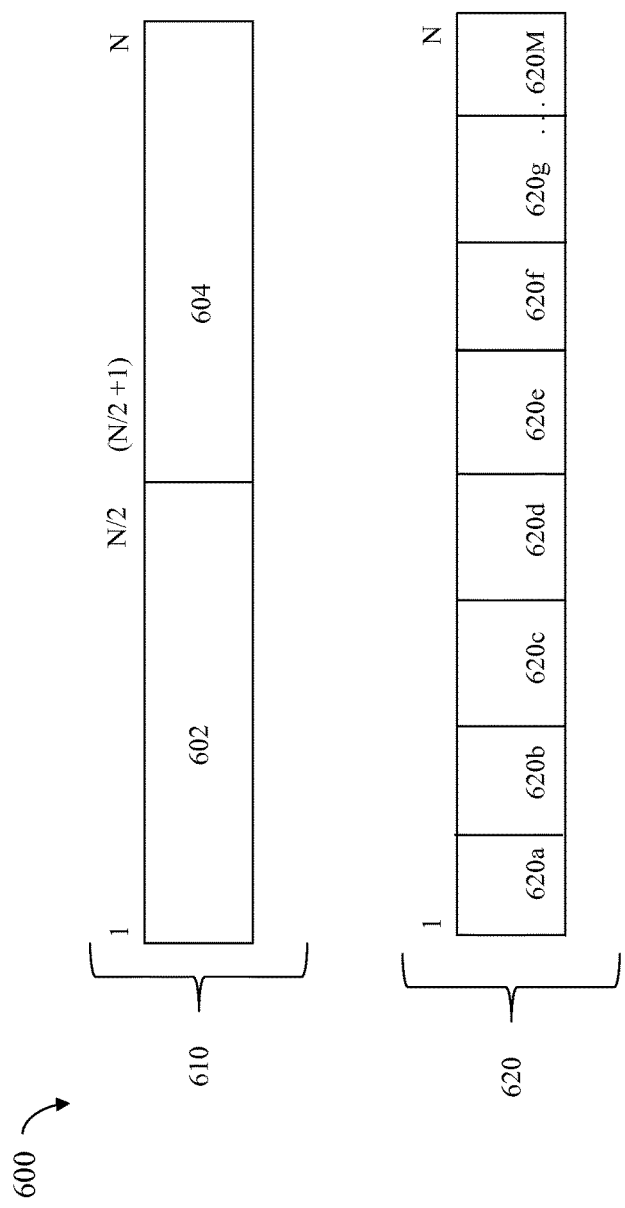
FIG. 8 is an example illustrating partitioning of a logical device's logical address space in an embodiment in accordance with techniques herein.

As another option, with reference now to FIG. 8, the appliance may send I/Os directed to a particular portion of the LUN's address space to DS1 and send I/Os directed to the remaining portion of the LUN's address space to DS2. In the example 600, element 610 may represent the address space or LBA range of a LUN having an inclusive LBA range of 1 through N. As one possibility, an embodiment in accordance with techniques herein may partition the logical address space of a single LUN into multiple partitions. Element 610 illustrates the LUN's logical address space partitioned into two equal partitions 602 and 604. In accordance with techniques herein, the appliance may send reads directed to LBAs in partition 602 to DS1 and reads directed to LBAs in partition 604 to DS2.

More generally, a LUN's logical address space may be divided into two or more partitions whereby the appliance sends reads directed to each partition to a single DS, such as either DS1 or DS2. For example, element 620 represents dividing the logical address space of a LUN into M partitions, M>1, where the appliance sends all reads directed to each partition to a single DS. For example, reads directed to partitions 620a, c, d, f, and g may be sent to DS1 with remaining reads directed to remaining ones of the M partitions sent to DS2. As illustrated in the example 620, the appliance does not have to evenly split such partitions among the data storage systems. Additionally, the partitions for which reads are directed and sent to a single DS may or may not be logically contiguous in the LUN's address space.

As another alternative, rather than send all reads of a LUN to single data storage system, such as DS1, an embodiment in accordance with techniques herein may send all reads directed to each LUN to both DS1 and DS2. In this case, the appliance receives the read and sends it to both DS1 and DS2 even though only a single copy of the read data is returned to the requesting host. This may be performed so that, for example, upon the failure of one of the data storage systems, such as DS1 failure, the other data storage system DS2 may handle all I/Os for the LUN without possible initial performance degradation. For example, if all I/Os for the LUN are sent to both DS1 and DS2 and DS1 fails, the cache of DS2 is already populated with any data of the LUN. Additionally, if DS2 performs data storage optimizations such as described above, DS2 may have up to date metrics and statistics of observed I/O workload directed to data portions of the LUN. In contrast, if the LUN's reads had been forwarded to just DS1, then DS2 may go through an initial period of poor performance (e.g., warm up) while its cache becomes populated with any of the LUN's data and while the data storage optimizer of DS2 gathers observed I/O workload data for the LUN's data portions. For example, prior to the failover, DS1 may have handled all reads for the LUN. At the time of failover to DS2, DS1 had stored all of the LUN's data on flash storage due to the currently high I/O workload directed to the LUN. Also, at the time of failover to DS2, all of the LUN's data may be currently stored on a relatively slow storage tier in DS2, such as SATA disk drives. It will take time for the data storage optimizer of DS2 to collect updated I/O workload metrics regarding the heavy current I/O workload of the LUN and then promote the LUN's data to the flash tier. During this time, I/Os, specifically reads, directed to the LUN which are now all serviced by DS2 will experience degraded performance in comparison to when the reads were serviced by DS1 since such requested read data may result in a read miss and also since the requested read data is stored on SATA disk drives rather than flash storage.

In one embodiment, the appliance may be configured to perform any of the techniques described herein with respect to selected LUNs. For example, it may be that one or more applications are performance critical applications and that such applications have their data stored on a defined set of LUNs. In this case, the appliance may be configured to send the reads for the LUNs of the set to both DS1 and DS2 to avoid any performance degradation that may initially otherwise be experienced should one of the data storage systems fail as described above. For other LUNs not in the defined set, the appliance may send reads to only a single data storage system in a manner as described elsewhere herein rather than both DS1 and DS2.

Figure 9:
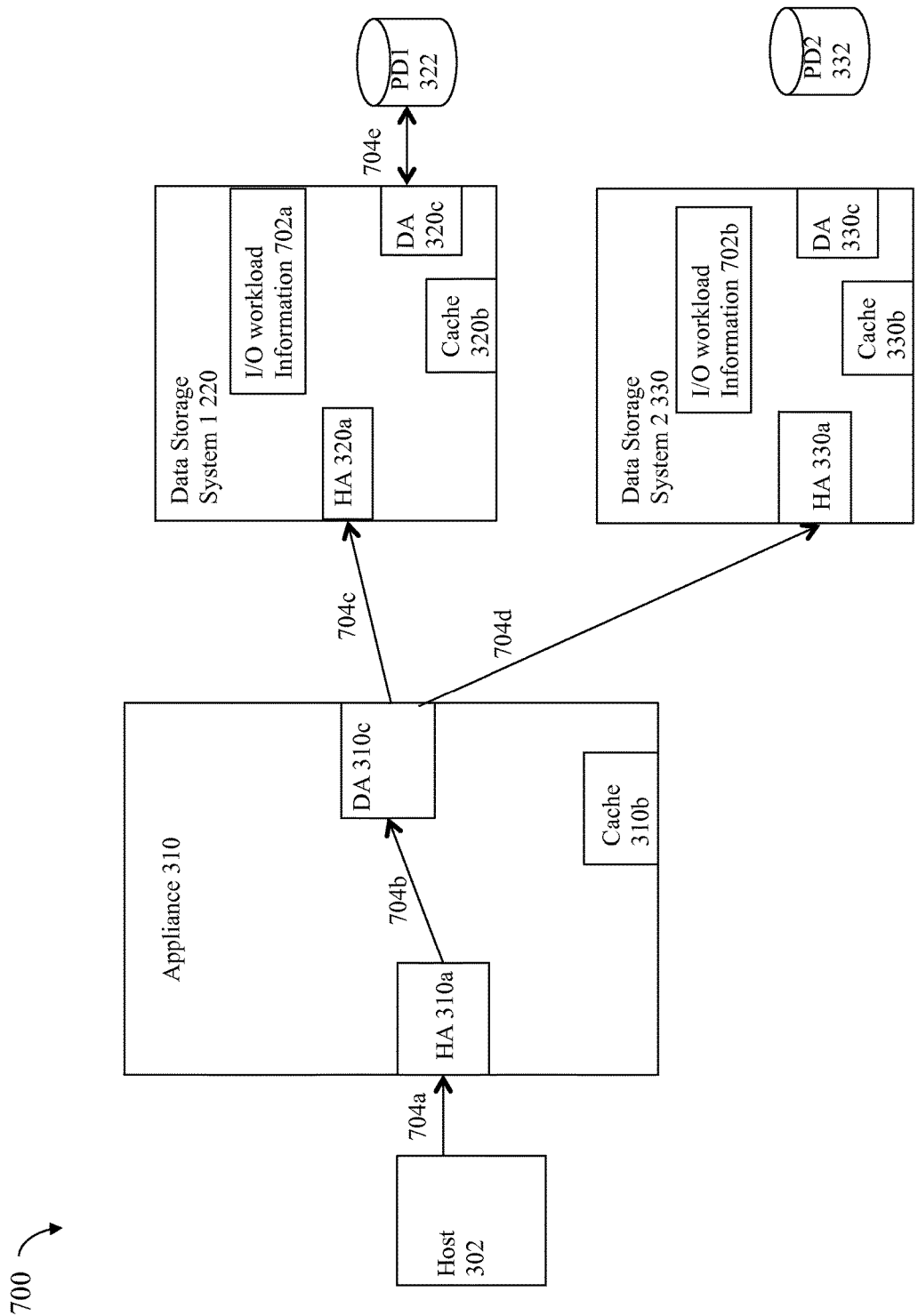

As yet another alternative reference is made to FIG. 9. In the example 700, components may be similarly numbered and as described in connection with other figures. For LUNs in the above-mentioned defined set, the appliance 310 may receive 704a a read request resulting in a read miss so that the read request is sent 704b to the DA 310c. The appliance 310 may use one or more criteria described herein regarding configurations of DS1 220 and DS2 330 to decide which one or more data storage systems 220 and/or 330 to send the read request. The appliance 310 may decide to send 704c the read request to a first of the data storage systems, such as DS1, and then instruct 704d the second data storage system, such as DS2, to simulate one or more aspects of reading the requested data without actually reading the requested data from a PD and without actually returning requested read data to the appliance. For example, DS2 may update I/O workload metrics and statistics 702b for the LUN based on the read operation without actually reading the requested data from physical storage PD2 332. The I/O workload metrics and statistics 702b may be I/O workload information used by the data storage optimizer in connection with determining what data portions to move to different storage tiers based on current I/O workloads of such data portions.

DS2 may also update cache-related information of 330b regarding read data of the LUN stored in cache without actually reading the requested data from physical storage and without storing the read data in cache. Cache related information, such as cache page header information and other information is described in following paragraphs in connection with FIG. 10. In this manner, the cache, its contents and information regarding the cache contents on DS2 330 may be simulated. For example, the cache-related information may indicate what data is stored in cache by an associated LUN and LBA even though such read data is not actually retrieved from physical storage and stored in cache. In this manner, the cache contents may be simulated. Additionally, the cache-related information on DS2 may indicate the last time cached data was referenced and may be accordingly updated with a simulated read request.

On DS1 220, the read request received by HA 320a may be serviced in a manner as described elsewhere herein where the read data is retrieved 704e from PD1 322, stored to cache 320b and then returned by HA 320a to the appliance 310. Additionally, the I/O workload information 702a for the LUN may be updated to reflect the additional read of 704c and cache-related information for cache 320b may be accordingly updated. The I/O workload metrics and statistics 702*a* is similar to 702*b* described above that includes I/O workload information used by the data storage optimizer in connection with determining what data portions to move to different storage tiers based on current I/O workloads of such data portions.

In this manner, should DS1 220 fail whereby DS2 330 takes over servicing I/Os directed to the LUN, DS2 330 has current I/O workload metrics and statistics 702*a* and current cache-related information of data that should be stored in cache 330*b*. DS2 330 may use such simulated cache information to populate the cache with data for the LUN and may use the current I/O workload metrics and statistics 702*a* for the LUN to decide in what storage tiers to place different data portions of the LUN without requiring an initial amount of time to collect accurate current I/O workload information for the LUN. In such a case, the initial period of possibly poor I/O performance for the LUN may be shortened or otherwise avoided since no initial warm-up or ramp-up time is needed to populate the cache 330*b* with the LUN data and to collect current I/O workload information of 702*a* for the LUN. If only the statistics are gathered, then during the initial period, DS2 will use the stored statistics or cache information to quickly preload that information into cache or faster storage tiers w/o having to wait first to gather those statistics.

Figure 10:
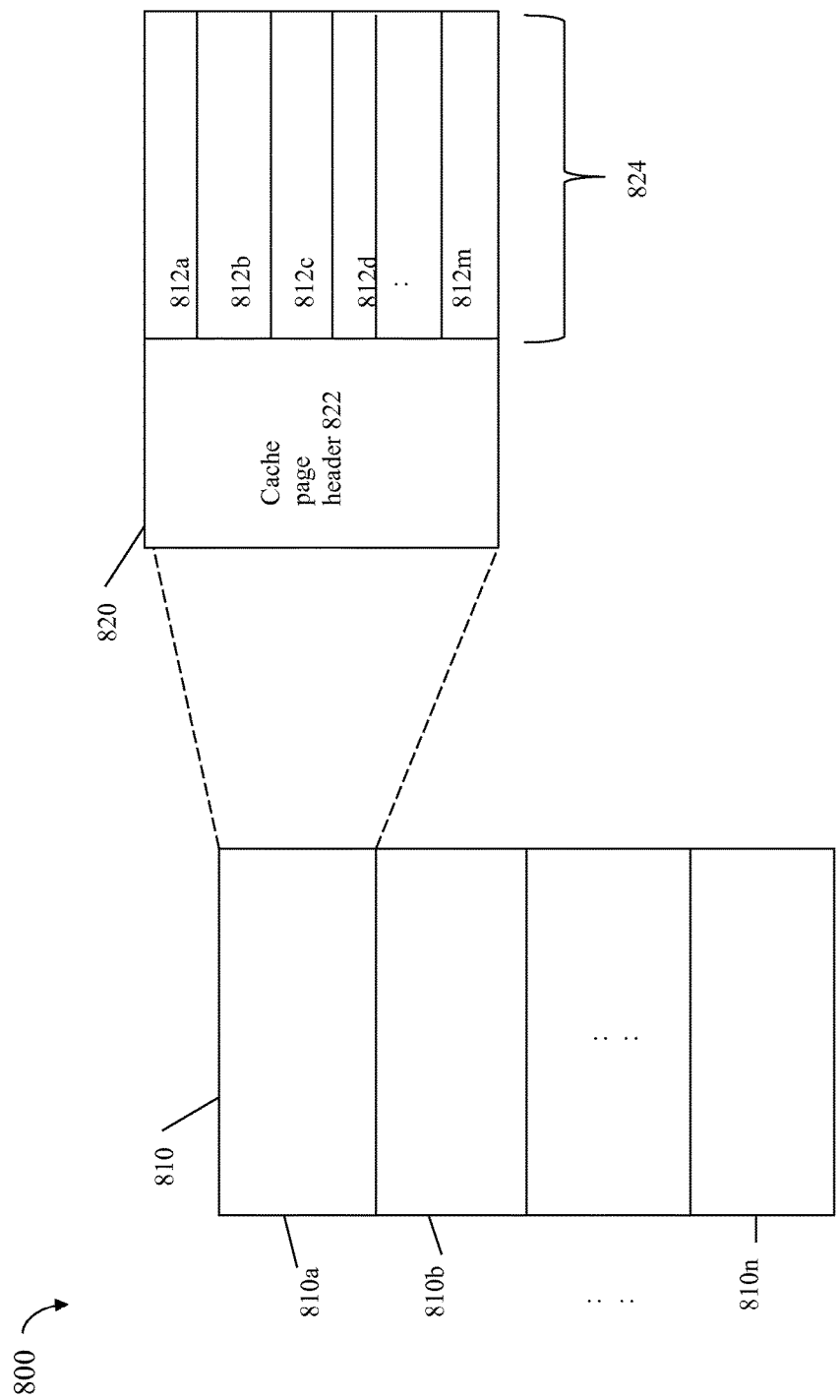
FIG. 10 is an example illustrating a representation of a data cache in an embodiment in accordance with techniques herein.

Referring to FIG. 10, shown is an example illustrating a logical representation of a data cache that may be used in an embodiment in accordance with techniques herein. The data cache of FIG. 10 may represent the data cache used by each of the data storage systems DS1 220 and DS2 330 and also the appliance 310.

In the example 800, element 810 may represent the memory or storage used as the data cache which is partitioned into cache pages 810*a*-810*n*. It should be noted that the example 800 is a logical representation of a cache that may be implemented using any suitable data structure(s) known in the art. Each of the cache pages 810*a*-*n* may contain varying amounts of WP data, cached read data, and the like. Element 820 provides additional detail of single cache page 820. Cache page 820 may include a cache page header 822 and cache page data 824. The cache page data 824 illustrates that a single cache page of data may further include multiple portions of data 812*a*-*m* each of which may or may not include WP data, read cached data, and the like, and each of which may or may not include any cached data. The cache page header 822 may include additional information, such as metadata, regarding the cached data stored in 824. For example, the header 822 may denote whether the data cached in each of the portions 812*a*-*m* is WP data.

Although not illustrated in FIG. 5 for simplicity and as known by those of ordinary skill in the art, an embodiment may store additional information for each of the cache pages regarding the data stored in each such page. For example, for a particular LUN and offset, such additional information may map the particular LUN and offset to a cache location containing the data for that LUN and offset. Such additional information may also, for example, map a particular PD and PD offset to a cache location containing the data for that PD and offset. Generally, such additional information may be stored in any suitable location and used, for example, by the HA, DA and other data storage system components and executing code, as an index to map into the data cache 810 to retrieve and/or store data from the cache. For example, the HA may manage and/or use information mapping a LUN and LUN offset to a cache location including data stored at the LUN offset on the particular LUN. The DA may manage and/or use information mapping a PD and offset on the PD to a cache location including data stored at the offset on the particular PD.

In a single cache page such as 810*a* (illustrated in more detail by 820), it may be that one or more portions 812*a*-*m* of the page 820 include WP data as well as non-WP data. For example, the cache page 820 may include non-WP data in 812*a* and 813*c* (e.g., 812*a* and 812*c* may include data read from a physical device and stored in the cache page in connection with servicing a read miss operation). Additionally, one or more portions 812*a*-*m* of the same cache page 820 including WP data may be empty and contain no data. For example, all of page 820 may include WP data except for 812*a*-*b* which may contain no cached data.

It should be noted that each portion 812*a*-*m* of a cache page may correspond, for example, to a track or other storage size unit. In an embodiment having a cache page size of 42 tracks, "m" denoting the number of portions in a single cache page 820 may be 42. For each track of a cache page, some or all data of a single track may be stored in cache since the size unit for reading and writing data may be less than a track.

With reference to FIG. 10, simulating the cache may include updating the above-mentioned index to identify that data of a particular LUN and LBA is stored in the cache even though no such data is actually stored in the data cache, updating information of the cache header 822 for a simulated cache page, for example, denoting whether the simulated stored data is WP, and the like. In this manner, metadata regarding the cache may be updated to simulate storing of data having particular characteristics in the data cache even though such data may not actually be stored in the cache. In such an embodiment, it may be that DS2 330 is used for simulating the cache 330*b* reads with writes actually being performed by both DS1 220 and DS2 330.

In the foregoing embodiment with respect to FIG. 9, the appliance 310 may instruct DS2 330 to simulate performing the read, for example, using a special opcode, command or instruction. As an alternative, the appliance may send regular read operations to both DS1 220 and also to DS2 330. However, DS2 330 may be configured to simulate reads and/or writes for a particular LUN such that any read operations received for a particular LUN should be interpreted as simulated even though the appliance may actually send a read command. DS2 may not actually read the requested data and may not return the real read data. Rather, DS2 330 may alternatively return to the appliance some other expected default information such as a sequence of zeroes. In this way, a regular read opcode may be used and sent by the appliance to both DS1 and DS2 whereby DS2 is configured to interpret such reads for selected LUNs as simulated reads.

As another example of techniques herein, in one embodiment, the appliance may perform processing to collect and analyze I/O workload information (e.g., such as the I/O workload statistics and metrics of 702*a* and 702*b*) for each LUN. The collection and analysis performed may replicate that as performed, for example, by the data storage optimizer in order to replicate what the optimizer would collect and analyze if provided with a complete I/O workload for the LUN. In one embodiment, the I/O workload information collected may be with respect to all I/Os, both reads and writes.

As described in the '838 patent, the I/O workload information (such as collected and used by the data storage optimizer 382 on each of DS1 and DS2 and also collected and used by the appliance) may be collected and stored per data portion of a LUN (e.g., at the sub-LUN level of granularity). In one embodiment, the logical address space of a LUN may be partitioned into data portions or extents of a particular granularity of a sufficient size. An embodiment may not want this size to be too small to avoid spending an unacceptable amount of resources in tracking and maintaining such I/O workload information. It should be noted that such I/O workload information may be determined and used for each extent, or more generally each portion of a LUN's logical address space, by both the appliance and the data storage systems.

Consider an embodiment with DS1 220 and DS2 330 storing replicated data for the LUN as described above. As a first step, the appliance 310 may issue writes to both DS1 and DS2 and may issue reads in an alternating round robin fashion or random fashion to DS1 and DS2. This may be performed for a specified time period, such as an hour, several hours, a day, and the like, during which I/O workload information may be collected for the LUN. After the specified amount of time has elapsed, the collected I/O workload data may be analyzed in a second step to determine "hot spots" of I/O workload for the LUN.

Figure 11:
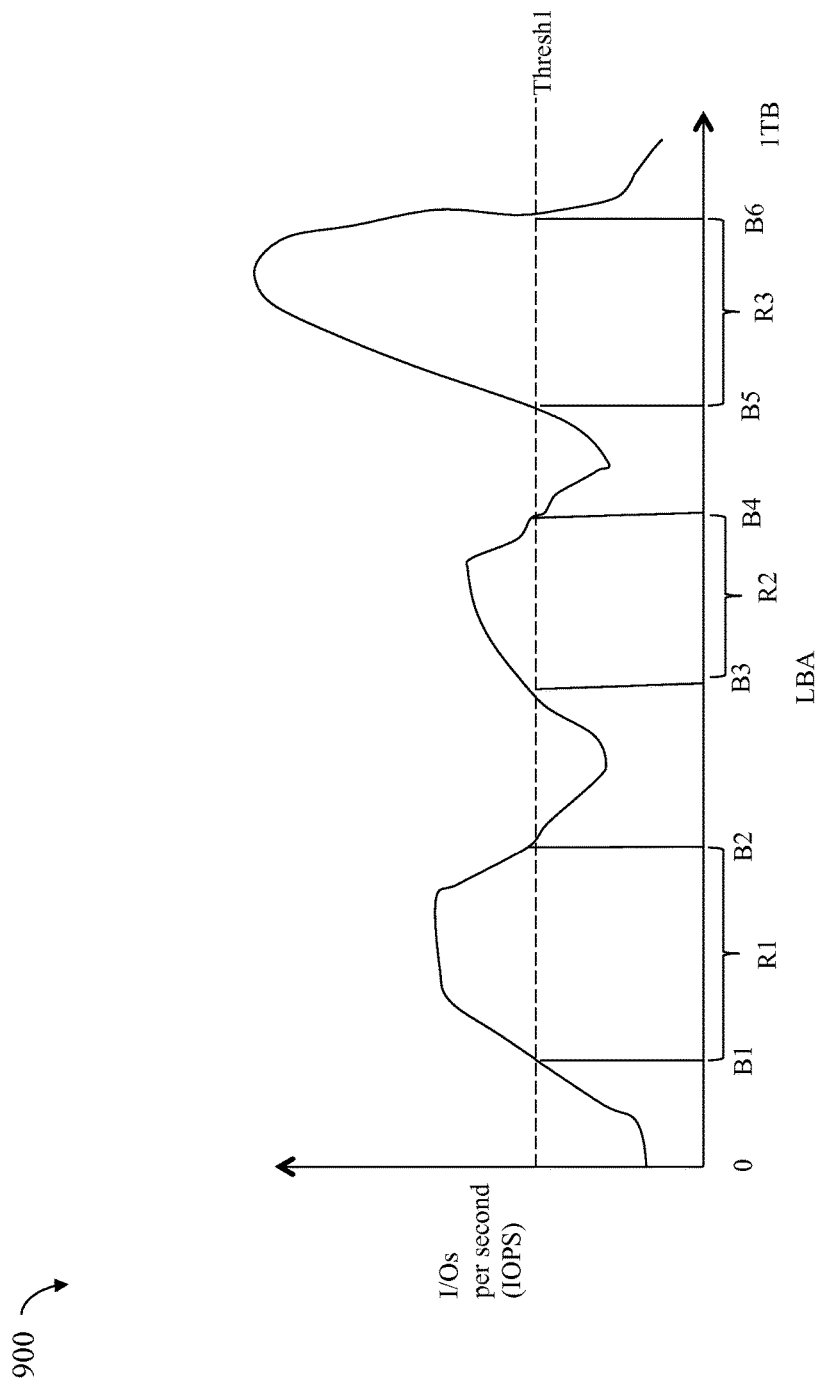
FIG. 11 is an example illustrating analysis of collected I/O workload information in an embodiment in accordance with techniques herein.

Referring to FIG. 11, shown is a graphical representation of the collected I/O workload information that may be used in an embodiment in accordance with techniques herein. The example 900 graphically illustrates collected I/O workload information for a LUN (collected for the specified amount of time noted above) with the I/O rate, such as in I/Os per second (IOPS) on the Y axis and the LBA range of the LUN (1 Terabyte (TB)) on the X axis. Such information may be analyzed to identify hotspots of I/O workload directed to one or more particular subranges of the LUN's logical address space. Each subrange may correspond to a set of consecutive LBAs of the LUN's logical address space. Thresh1 may represent a threshold level of IOPs where subranges of the LUNs address space having associated I/O workload in terms of IOPS that exceeds thresh1 may be identified. In this example 900, R1, R2 and R3 may each represent a subrange of the LUN's logical address space having I/O workload exceeding thresh1. Thresh1 may be a threshold level of activity denoting, for example, a threshold level of activity used by the data storage optimizer whereby data portions having an I/O workload exceeding thresh1 may be stored on flash storage. In this manner, the appliance may identify which data portions a data storage optimizer on either DS1 or DS2 would promote to flash-based storage if all such I/Os directed to the data portions were sent to the same single data storage system. It should be noted that some embodiments of the data storage optimizer on DS1 and/or DS2 may periodically recalculate the value used for its flash tier promotion threshold at various points in time and such updates or changes to the threshold used by the optimizer may be periodically reported to the appliance for use with techniques herein. Thus, at any particular point in time, the value of Thresh1 used for processing in accordance with techniques herein may or may not exactly match the actual flash storage tier promotion threshold used by the data storage optimizer at the same point in time. In such cases, processing may be performed to determine a value for Thresh1 to use in connection with techniques herein based on one or more flash storage tier promotion threshold as reported by a data storage system. For example, techniques herein may use a value for Thresh1 which is characterized as approximating the actual flash storage tier promotion threshold used by a data storage system. Techniques herein may, for example, use the most recently reported actual flash storage tier promotion threshold as Thresh1. As another alternative, techniques herein may determine an average or weighted average (e.g., with most weight given to most recent values) of multiple flash storage tier promotion thresholds reported by a data storage system and use such an average or weighted average as Thresh1. As yet another alternative, an embodiment may use the most recently reported actual flash storage tier promotion threshold and define a range of values to use for Thresh1 such as Thresh1+/−range, and define rule(s) for data portions with I/O workloads falling in the range. For example, any data portion having an associated I/O workload greater than the lower bound (e.g. Thresh1-range) may be modeled as promoted to flash. More generally, an embodiment may use other techniques for determining and using a value for Thresh1 that approximates the actual promotion threshold used by the data storage optimizer of a data storage system at a particular point in time.

In a third step, each such hotspot, such as each of R1, R2 and R3, the appliance may then selectively direct all reads, in addition to the writes, to a single one of the data storage systems, such as DS1. In this manner, the data storage optimizer of DS1 would perform processing and analysis similar to that as performed on the appliance and would promote data stored at LBA subranges R1, R2 and R3 to flash storage. In one embodiment, the appliance may alternate between DS1 and DS2 for different hotspots in sending all reads for a hotspot to a single data storage system. For example, the appliance may send all reads directed to R1 of the LUN to DS1, may send all reads directed to R2 of the LUN to DS2, may send all reads directed to R2 of the LUN to DS1, and so on, in alternating round robin manner. In this way, the appliance determines which LBA subranges would benefit in terms of performance form all their reads go to the same data storage system (e.g., where sending all such reads for an LBA subrange would result in the receiving data storage system promote to flash and thereby provide better performance).

In such an embodiment, the appliance may perform a locality of reference analysis, such as just described with respect to I/O workload in terms of IOPS to facilitate better performance by the data storage optimizer located on a data storage system, such as the data storage optimizer 382 described herein. Additionally, directing I/Os for an LBA subrange of the LUN's logical address space identified as a hot spot of heavy workload has caching benefits due to the locality of reference. For example, data for the hotspot subrange may be initially brought into cache and may have a high likelihood based on the heavy I/O workload of being referenced again whereby for reads a read hit results (e.g, high likelihood of a read hit). It should be noted that such a benefit may be likely depending on the I/O mixture of the I/O workload directed to the hotspot subrange. The larger the amount of reads, the greater the occurrence of a read hit and thus the greater the performance benefit.

Additionally, the I/O workload information collected during the specified time period may be analyzed to identify sequential read patterns such as performed by the sequential pattern detection and prefetch processing module 384. For such identified sequential read patterns, the appliance may identify the next sequential LBAs of the detected pattern and send multiple subsequent reads to the same data storage system. For example, the appliance may track having received the following sequence of reads from a host directed to the LUN: a first read from directed to LBA 10, a second read to LBA 11 and a third read to LBA 12. Based on the foregoing, the appliance may detect a sequential read pattern and know that DS1 and DS2 perform prefetching responsive to detecting sequential read patterns (e.g., both DS1 and DS2 have module 384 that performs such processing for the LUN). As such, the appliance may then choose to send the next consecutively received set of reads directed to the LUN to the same data storage system, such as DS1. Alternatively, the appliance may resend the entire sequence to one or both of DS1 and DS2 so that they can immediately recognize the sequential read pattern and prefetch subsequent LBAs.

The foregoing collection of I/O workload information for each LUN and analysis of such collected information may be periodically repeated since the I/O workloads of different data portions (e.g., LBA subranges) may change over time. In the foregoing embodiment, the appliance may be characterized as replicating analysis performed by the data storage optimizer on a data storage system in determining which data portions to store on flash storage. The appliance may also execute a cache simulator replicating caching performed by each of the data storage systems. Such cache simulation may be performed in accordance with criteria for the data storage systems indicating information about caching techniques performed, an average lifetime, and the like. In this manner, when the appliance receives a read operation, the appliance may determine through its cache simulator which data storage system's cache likely includes the requested read data and may accordingly send the read operation to just that data storage system for servicing.

As an alternative to having the appliance collect the above-mentioned I/O workload information for each LUN, an embodiment in accordance with techniques herein may alternatively have each of DS1 220 and DS2 320 report its own partial view of collected I/O workload information for each LUN. The appliance may then combine such partial views of I/O workload information for as obtained from DS1 and DS2 to obtain a complete view regarding the current I/O workload for each LUN and its data portions.

Figure 12:
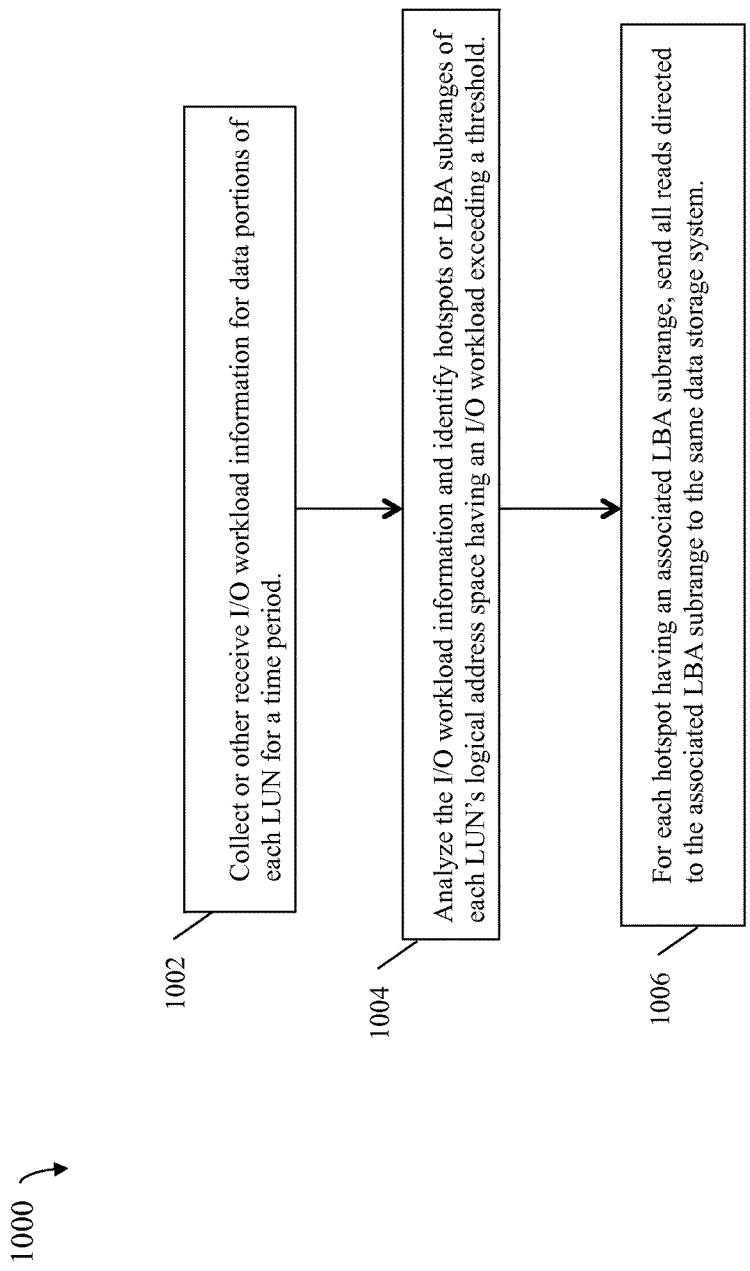
FIGS. 12, 13 and 17 are flowcharts of processing steps that may be performed in an embodiment in accordance with techniques herein.

Referring to FIG. 12, shown is a flowchart of processing steps that may be performed in an embodiment in accordance with techniques herein. The flowchart 1000 summarizes processing just described above in connection with FIG. 11. At step 1002, I/O workload information for data portions of each LUN may be collected or received for a time period. The I/O workload information collected or received in step 1002 may represent the overall I/O workload directed to both DS1 and DS2. At step 1004, the I/O workload information from step 1002 may be analyzed as described above in connection with FIG. 11. At step 1006, for each hotspot having an associated LBA subrange of a LUN, the appliance may send all reads directed to the associated LBA subrange to the same data storage system. The foregoing of flowchart 1000 may be repeated periodically, such as at defined periods of time, to reassess the I/O workloads of the data portions of the different LUNs.

It should be generally noted that each data storage system, such as DS1 and DS2, provides a partial performance view with respect to a LUN and its data portions. Using techniques herein, the appliance may collect such performance and workload information from all the data storage systems to determine a collective complete picture regarding workload and performance across all data storage systems having storage managed by the appliance, such as DS1 and DS2. The collective complete picture of workload and performance across all data storage systems may be used for any suitable purpose some of which are described herein. Additionally, other purposes may relate, for example, to SLOs (service level objectives) and determining whether such SLOs are being met.

As described above, the appliance may obtain a complete or overall set of I/O workload information that is the aggregate of all I/Os directed to each data portion of each LUN. As another use of such information, the appliance may periodically provide the complete overall I/O workload information to each of the data storage systems DS1 and DS2. The data storage optimizer 382 on each of DS1 and DS2 may then use the complete overall I/O workload information to perform data storage optimizations. The foregoing complete overall I/O workload information may be used on each of DS1 and DS2 rather than have each data storage system use only its partial view of collected I/O workload data. Rather, the complete workload view of all I/Os directed to each data portion of each LUN may be provided by the appliance to the data storage systems for use in performing data storage optimizations.

Figure 13:
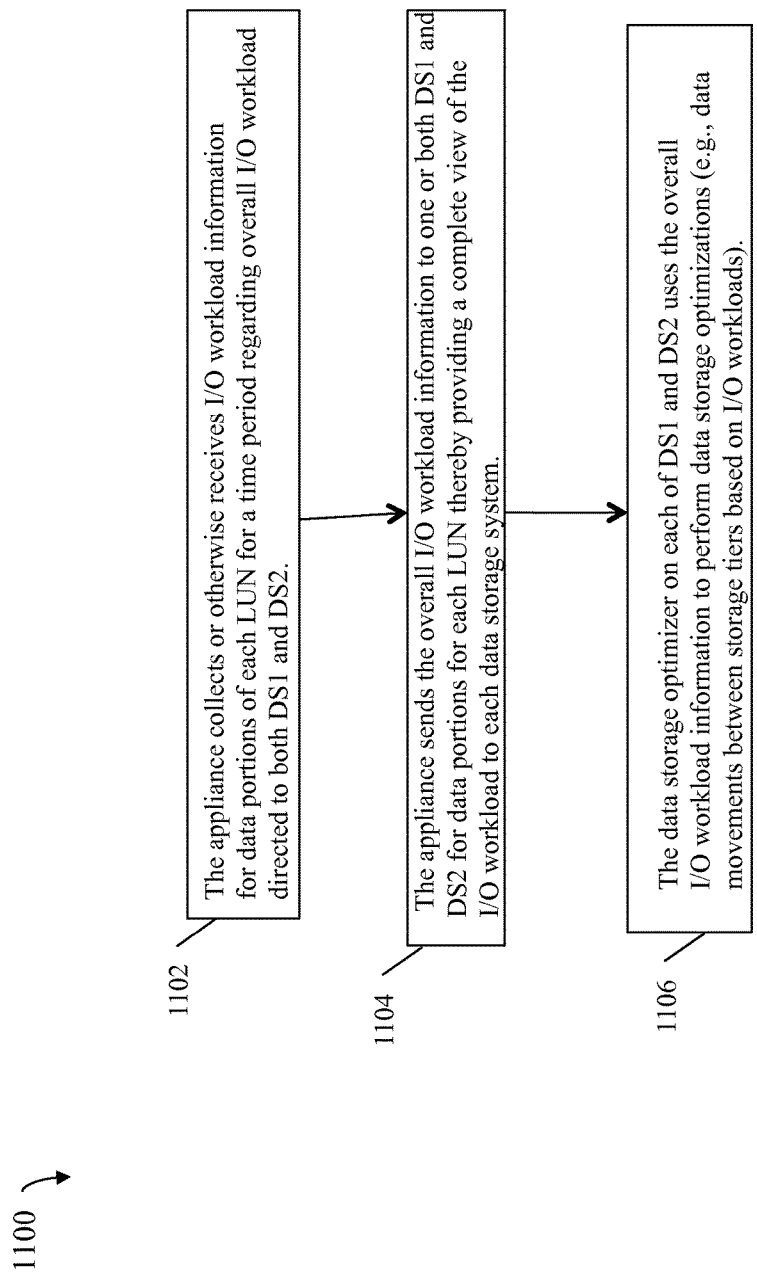

Referring to FIG. 13, shown is a flowchart 1100 summarizing processing just described above that may be performed in an embodiment in accordance with techniques herein. At step 1102, the appliance collects or otherwise receives I/O workload information for data portions of each LUN for a time period regarding the overall I/O workload directed to both DS1 and DS2. At step 1104, the appliance sends the overall I/O workload information to both DS1 and DS2 thereby providing a complete view of the I/O workload to each data storage system. At step 1106, the data storage optimizer on each of DS1 and DS2 may use the overall I/O workload information received in step 1106 to perform data storage optimizations such as data movements between storage tiers based on I/O workloads as described elsewhere herein.

It should be noted that described herein are examples where data of a LUN may be mirrored or replicated on two data storage systems, such as DS1 and DS2. More generally, techniques herein may be used in connection with any number N of data storage systems where there may be N copies of the LUN's data, N>1. For values of N>2, the LUN's data may be replicated on the N data storage systems so that the appliance in accordance with techniques herein may generally use the one or more criteria to select one of the N data storage systems to direct reads for the LUN. In such a case, as described above, the entire set of LUN data may be replicated at each of the N data storage systems.

Figure 14:
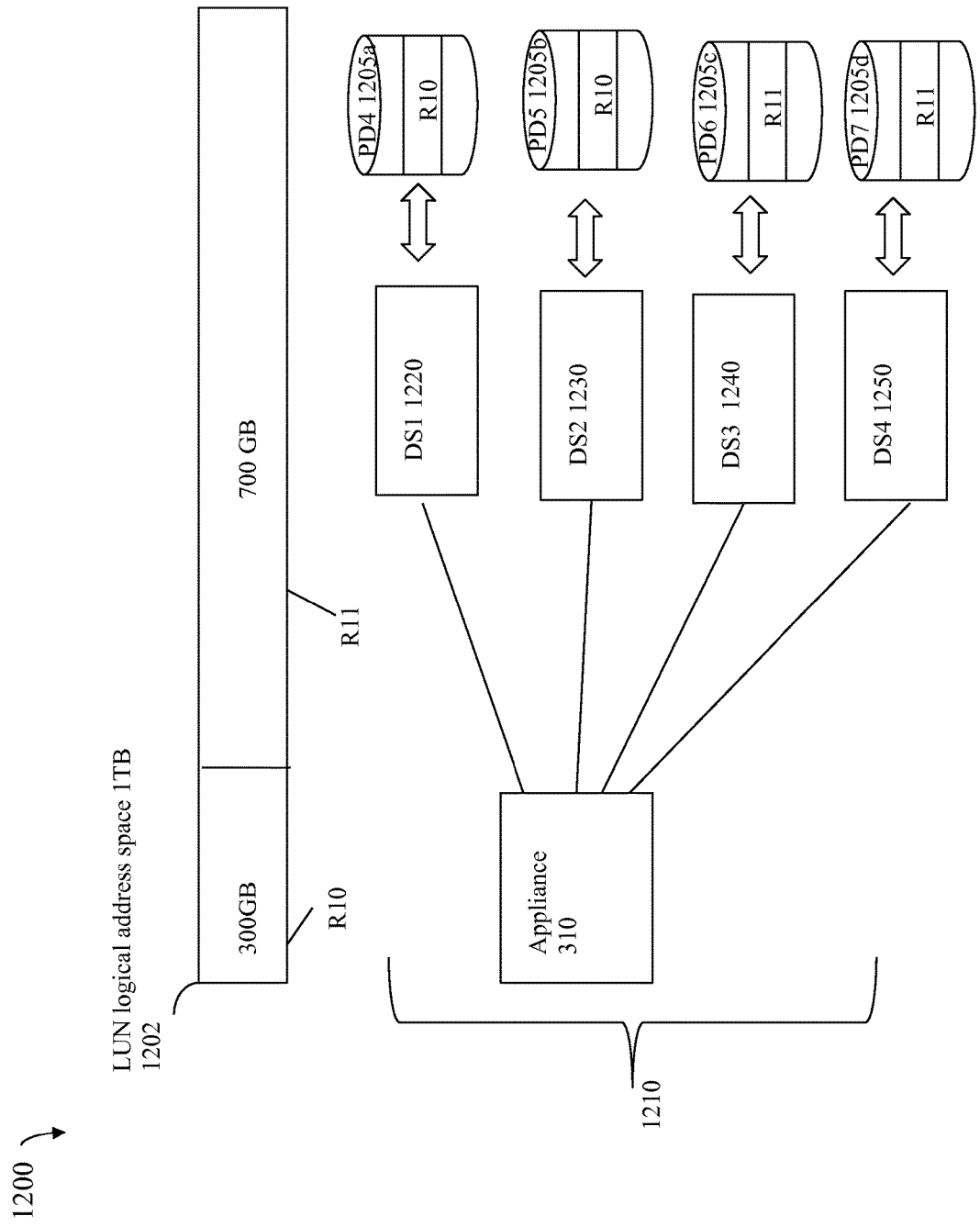
FIG. 14 is an example illustrating a logical address of a LUN and replication of the LUN's data among a plurality of data storage systems in an embodiment in accordance with techniques herein.

As a variation, techniques herein may also be used in connection with replicating less than the entire set of LUN data on each data storage system. To further illustrate, reference is made to FIG. 14. In the example 1200, element 1202 represents the 1 TB logical address space of a LUN. The LUN's address space may be divided into two partitions R10 and R11, where R10 is 300 GB and R11 is 700 GB. Each of R10 and R11 may represent a contiguous LBA subrange of the illustrated LUN logical address space 1202.

Element 1210 includes a simplified representation of components that may be included in an embodiment in accordance with techniques herein. The example 1210 includes appliance 310 as described above and additionally includes 4 data storage systems DS1 1220, DS2 1230, DS3 1240 and DS4 1250. Each of 1220, 1230, 1240 and 1250 may include components similar to the data storage system described elsewhere herein (e.g. such as DS1 220 and DS2 330). In this example, partition R10 of the LUN may be replicated on data storage systems 1220 and 1230 and partition R11 of the LUN may be replicated on data storage systems 1240 and 1250. In such an embodiment, the appliance 310 may perform processing as described herein to select one or more of data storage systems 1220 and 1230 to send reads directed to a logical address in partition R10, and also to select one or more of data storage systems 1240 and 1250 to send reads directed to a logical address in partition R11.

It should be noted that although R10 and R11 are illustrated as each corresponding to a single contiguous LBA subrange, techniques herein may be performed in an embodiment where R10 and R11 may not each correspond to a single contiguous LBA subrange. To further illustrate, the LUN's logical address space 1202 may be partitioned into 10 equal partitions each being 1 GB of contiguous logical address space of the LUN (e.g, each corresponding to a single contiguous LBA subrange of 1202). In this case, the 700 GBs of the LUN data stored or mirrored on both DS 1240 and 1250 may be any 7 of the foregoing 10 equal partitions. Similarly, the 300 GBs of the LUN data stored or mirrored on both DS 1220 and DS 1230 may be any 3 of the foregoing 10 equal partitions.

In connection with embodiments operating in accordance with techniques described herein, each data storage system to which an I/O may be forwarded may be configured to have the same set of components, for example, such as in FIG. 5C described above. In such a case, the one or more criteria may include information regarding the configuration of each data storage system such as the particular modules, services or operations configured and which affect I/O operation processing and performance.

As an exemplary alternative to the foregoing, the particular configuration of each data storage system may vary. For example, with reference to FIG. 9, DS1 220 may be configured to have all components as in FIG. 5C and DS2 330 may be configured to only have modules 384 and 386 and not be configured to have optimizer 382 whereby DS2 330 does not perform data storage movement optimizations. It may be, for example, that DS1 220 includes multiple storage tiers and DS2 330 only includes a single tier or type of physical storage device whereby there is no need on DS2 330 for such data movement optimizations between storage tiers since there is only a single storage tier. In such a case, the one or more criteria may include information regarding the configuration of each data storage system such as, for each data storage system, the particular modules, services or operations configured and which affect I/O operation processing and performance.

Figure 15:
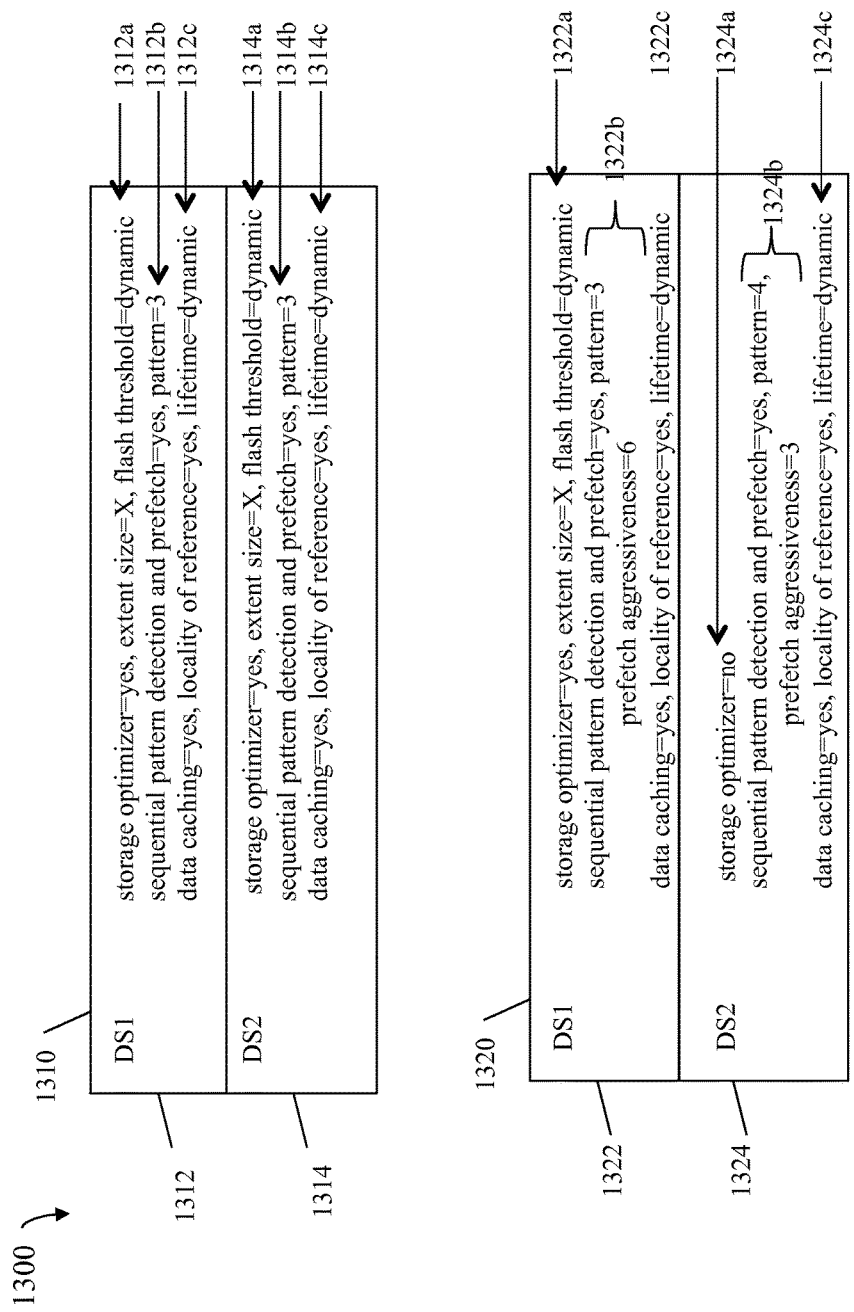
FIGS. 15 and 16 are examples of criteria that may be used in an embodiment in accordance with techniques herein.
Figure 16:
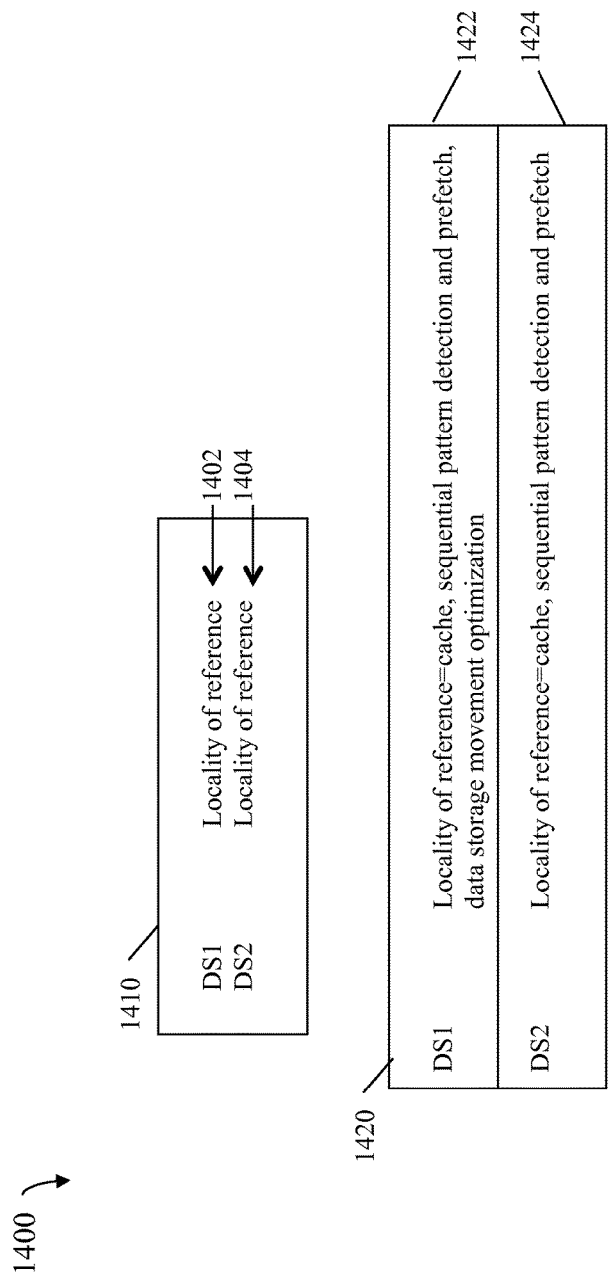

What will now be described in connection with FIGS. 15 and 16 are examples of the one or more criteria that maybe used by the appliance in accordance with techniques herein to decide which one or more data storage systems to forward an I/O operation, such as a read operation. FIGS. 15 and 16 illustrate different types of information and varying levels of granularity for such criteria used by the appliance in an embodiment in accordance with techniques herein.

Referring to FIG. 15, shown are examples 1300 representing information that may be included in the one or more criteria used by the appliance in an embodiment in accordance with techniques herein to decide which one or more data storage system to forward an I/O operation.

Element 1310 may represent a first example of a first set of criteria for two data storage systems, DS1 and DS2, such as described above, where both DS1 and DS2 are configured to have the same options. Element 1312 represents criteria denoting configuration options of DS1 and element 1314 represents criteria denoting configuration options of DS2. Element 1312 indicates that DS1 is configured with all components of FIG. 5C.

Line 1312a indicates that DS1 is configured with a data storage optimizer that collects I/O workload information (e.g. metrics and statistics) at the extent level (e.g., where extent may have a predefined size of X storage units, such as bytes, GB, and the like), and where the data storage optimizer performs automated movements or relocation between storage tiers and promotes a data portion to the flash tier if the data portion's I/O workload exceeds a threshold level that is dynamically determined. The indications of "flash threshold=dynamic" in line 1312a denotes that the appliance may obtain a current value for the flash promotion threshold from DS1 at various points in time, such as through a defined interface.

Line 1312b indicates that DS1 is configured with a module that performs sequential pattern detection of reads and performs prefetching. Additionally, "pattern=3" in line 1312b denotes that three sequential reads results in a determination of a sequential pattern on DS1.

Line 1312c indicates that DS1 is configured with a module that performs data caching using locality of reference algorithms, such as LRU. Additionally, "lifetime=dynamic" in line 1312c denotes that the appliance may obtain a current value for the average lifetime of a data item in cache from DS1 at various points in time, such as through a defined interface, since the average lifetime may change over time using caching techniques implemented on DS1.

Element 1314 indicates that DS2 is configured similar to DS1 as noted above.

Element 1320 may represent a second example of a second set of criteria for two data storage systems, DS1 and DS2, such as described above, where both DS1 and DS2 are configured differently to have different options. Element 1322 represents criteria denoting configuration options of DS1 and element 1324 represents criteria denoting configuration options of DS2.

Element 1322 indicates that DS1 is configured with all components of FIG. 5C. Lines 1322a and 1322c are respectively similar to 1312a and 1312c described above. Line 1322b indicates that DS1 is configured with a module that performs sequential pattern detection of reads and performs prefetching. Additionally, "pattern=3" in line 1322b denotes that three sequential reads results in a determination of a sequential pattern on DS1. Additionally, "prefetch aggressiveness=6" of line 1322b may denote a level of prefetching aggressiveness performed by DS1. The prefetch aggressiveness may be, for example, an integer value, such as in the inclusive range of 1 through 10, denoting a relative level of aggressiveness at which prefetching is performed responsive to detection of a sequential read pattern. The appliance may want to know the prefetch level of aggressiveness when selecting a particular data storage system to service read operations, for example, for a performance critical application. The appliance may, for example, select a data storage system having a highest such prefetch aggressiveness level.

Element 1324 indicates that DS2 is configured with components 384 and 386 of FIG. 5C but not 382 of FIG. 5C. Line 1324a indicates that DS2 does not perform data storage movement optimizations. Line 1324b is similar to line 1322b with the difference that line 1324b indicates a different level of prefetch aggressiveness of 3 (rather than 6). Line 1324c is similar to 1312c described above.

Referring to FIG. 16, shown are additional examples 1400 representing information that may be included in the one or more criteria used by the appliance in an embodiment in accordance with techniques herein to decide which one or more data storage system to forward an I/O operation. Generally, the criteria of FIG. 15 is more detailed than that provided in the examples of FIG. 16.

Element 1410 may represent a third example of a third set of criteria for two data storage systems, DS1 and DS2, such as described above, where both DS1 and DS2 are configured to have the same options including all modules of FIG. 5C. Line 1402 indicates that DS1 uses locality of reference techniques, such as may be related to caching, prefetching and/or other optimization options. However, the criteria of 1402 is a general indicator and does not provide more detailed information regarding the particular configuration options of DS1. Line 1404 for DS2 is similar to line 1402.

Element 1420 may represent a fourth example of a fourth set of criteria for two data storage systems, DS1 and DS2, such as described above, where both DS1 and DS2 are configured differently to have different options. Element 1422 represents criteria denoting configuration options of DS1 and element 1424 represents criteria denoting configuration options of DS2.

Element 1422 indicates that DS1 is configured with all components of FIG. 5C and uses locality of reference techniques for caching, sequential pattern detection and prefetching, and data storage movement optimization. Element 1424 indicates that DS2 is configured with modules 384 and 386 of FIG. 5C but not module 382 whereby DS2 uses locality of reference techniques for caching, and sequential pattern detection and prefetching.

Figure 17:
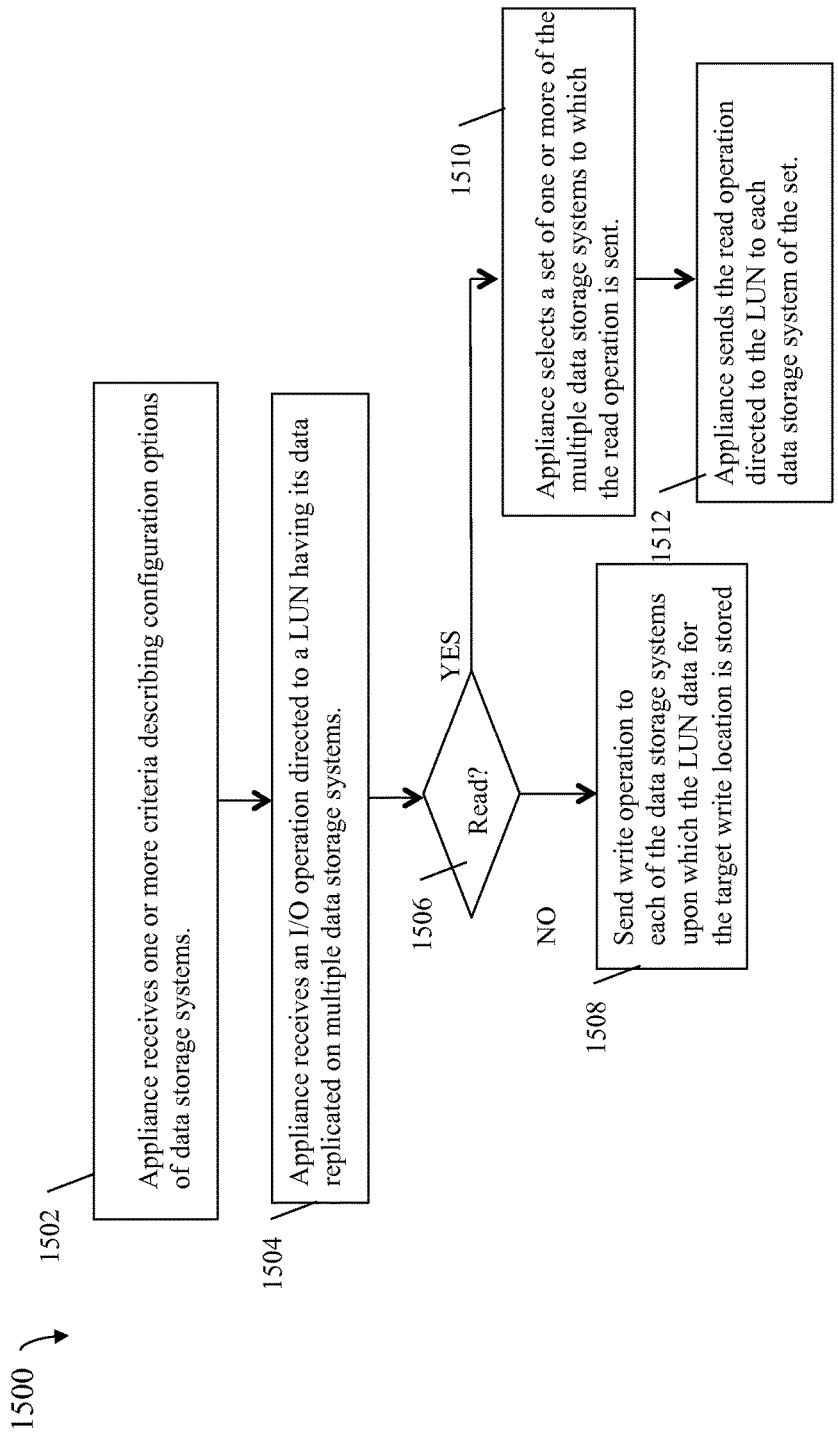

Referring to FIG. 17, shown is a flowchart 1500 of processing steps that may be performed in an embodiment in accordance with techniques herein. The flowchart 1500 summarizes processing described above. At step 1502, the appliance receives the one or more criteria describing configuration options of the data storage systems to which the appliance can forward I/Os for processing. At step 1504, the appliance receives an I/O operation directed to a LUN having its data replicated on multiple data storage systems. At step 1506, a determination is made as to whether the I/O operation is a read operation. If step 1506 evaluates to yes, control proceeds to step 1510 to process the read operation. At step 1510, the appliance selects a set of one or more of the multiple data storage systems to which the read operation is sent. As described above, the appliance may select a single data storage system to service the read operation. For example, based on the one or more criteria, the appliance may select a single data storage system to which the read operation is to be sent. Alternatively, the appliance may select multiple data storage systems to which the read operation will be sent. For example, as described above in an embodiment where the read data is replicated on two data storage systems, the appliance may send the read operation to both data storage systems. At step 1512, the appliance sends the read operation to each data storage system of the set determined in step 1510. If step 1506 evaluates to no, indicating the I/O operation is a write operation, control proceeds to step 1508 where the write operation may be sent to each of the data storage system upon which the LUN data for the target write location is stored. For example, the write operation may write data to LUN A, LBA 100 and DS1 and DS2 may both store a copy of the LUNs data for LUN A, LBA 100 whereby step 1508 results in sending the write to both DS1 and DS2.

Techniques described herein may be used to provide the appliance with a new type of data storage system awareness whereby the appliance, through the one or more criteria, is aware of the various mechanisms that the data storage systems utilize to identify I/O workload patterns and how the data storage systems optimize their respective performance based on such I/O workload patterns. These performance optimizations typically impact only future performance but are based on the storage system having a complete view of all the I/O operations issued to each LUN. Using techniques herein, the appliance facilitates optimizations performed by the data storage systems to result in increased performance.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing I/O operations comprising:
   receiving, at a storage appliance from a host, a plurality of read operations directed to a logical device having its data replicated on a plurality of data storage systems, wherein the storage appliance virtualizes storage resources of the plurality of data storage systems by presenting the storage resources to the host as a single pool of storage;
   sending, by the storage appliance, the plurality of read operations to a first of the plurality of data storage systems;
   detecting, by the storage appliance, that the plurality of read operations form a sequential read pattern of consecutive reads directed to consecutive logical addresses of the logical device;
   identifying, by the storage appliance, a plurality of next sequential logical addresses of the sequential read pattern of the logical device;
   receiving, at the storage appliance from the host, a sequence of subsequent reads directed to the next sequential logical addresses of the sequential read pattern of the logical device;
   determining, in accordance with one or more criteria, a set of the plurality of data storage systems that are candidates to perform processing for the sequence of subsequent reads, wherein the one or more criteria include information describing current configuration options of the plurality of data storage systems affecting I/O operation performance, said one or more criteria including, for each of the plurality of data storage systems for which the storage appliance virtualizes storage resources, an indication regarding whether said each data storage system performs sequential read pattern detection and data prefetching for detected sequential read patterns, wherein the set includes the first data storage system and a second of the plurality of data storage systems, and wherein the criteria indicates that both the first data storage system and the second data storage system for which the storage appliance virtualizes storage resources perform sequential read pattern detection and data prefetching for detected sequential read patterns, wherein the first data storage system includes a first data cache used by the first data storage system and not used by the second data storage system, the second data storage system includes a second data cache used by the second data storage system and not used by the first data storage system, a first copy of the logical device is stored on physical devices of the first data storage system, and a second copy of the logical device is stored on physical devices of the second data storage system;

determining that the plurality of read operations were previously sent to the first data storage system and not sent to the second data storage system;

responsive to determining the plurality of read operations were previously sent to the first data storage system and not sent to the second data storage system, sending, by the storage appliance, the sequence of subsequent reads to the first data storage system but not the second data storage system; and servicing, by the first data storage system, the sequence of subsequent reads using prefetched data stored in the first data cache.

2. The method of claim 1, wherein the one or more criteria include an indication regarding whether each of the plurality of data storage systems performs data storage optimizations.

3. The method of claim 2, wherein each data storage system in the set includes a plurality of storage tiers, each of the plurality of storage tiers having physical storage devices with performance characteristics that differ from other performance characteristics of other physical storage devices of other ones of the plurality of storage tiers, and wherein the data storage optimizations are performed on said each data storage system by a data storage optimizer of said each data storage system, and wherein the data storage optimizations include automatically relocating data portions among the plurality of storage tiers in accordance with an I/O workload associated with each of the data portions.

4. The method of claim 1, wherein the current configuration options of the plurality of data storage systems described by the one or more criteria impact performance of I/O operations received subsequent to the plurality of read operations.

5. The method of claim 3, wherein the logical device has a logical address space divided into a plurality of partitions and wherein the storage appliance performs first processing comprising:

collecting I/O workload information for each of the plurality of partitions regarding I/O operations having a target location in said each partition;

analyzing the I/O workload information for each of the plurality of partitions;

determining, in accordance with said analyzing, one or more of the plurality of partitions having a current I/O workload exceeding a specified threshold; and sending a second plurality of read operations reading data from a location on the logical device located in a first of the one or more of the plurality of partitions to a same one of the plurality of data storage systems.

6. The method of claim 5, wherein the specified threshold approximates a promotion threshold used by the data storage optimizer of the same one of the plurality of data storage systems to promote a data portion to a particular one of the plurality of storage tiers.

7. The method of claim 3, further comprising:

sending one or more additional read operations to each of the first data storage system and the second data storage system, the first data storage system servicing the one or more additional read operations and returning requested read data, and wherein the second data storage system does not retrieve the requested read data from physical storage and does not return the requested read data, said second data storage system simulating one or more aspects of performing the one or more additional read operations, said one or more aspects including any of simulating cache contents and cache-related information to reflect having performed the one or more additional read operations and simulating generating updated I/O workload information to reflect having performed the one or more additional read operations, wherein the updated I/O workload information is used by the data storage optimizer of the second data storage system to determine placement of data portions on different ones of the plurality of storage tiers of the second data storage system.

8. The method of claim 3, further comprising:

sending one or more additional read operations to each of the first data storage system and the second data storage system, each of the first data storage system and the second data storage system collecting I/O workload information for data portions of the logical device whereby the I/O workload information is used by the data storage optimizer of said each data storage system to locate data portions having highest I/O workload to a flash storage tier of the plurality of storage tiers of said each data storage system, at least some data portions of the logical device being located on the flash storage tier of said each data storage system, and wherein the method further includes:

detecting failure of one of the first and the second data storage systems; and subsequent to the failure, sending all I/O operations directed to the logical device to the other of the first and the second data storage systems.

9. A system comprising:

a processor; and a memory comprising code stored thereon that, when executed, performs a method of processing I/O operations comprising:

receiving, at a storage appliance from a host, a plurality of read operations directed to a logical device having its data replicated on a plurality of data storage systems, wherein the storage appliance virtualizes storage resources of the plurality of data storage systems by presenting the storage resources to the host as a single pool of storage;

sending, by the storage appliance, the plurality of read operations to a first of the plurality of data storage systems;

detecting, by the storage appliance, that the plurality of read operations form a sequential read pattern of consecutive reads directed to consecutive logical addresses of the logical device;

identifying, by the storage appliance, a plurality of next sequential logical addresses of the sequential read pattern of the logical device;

receiving, at the storage appliance from the host, a sequence of subsequent reads directed to the next sequential logical addresses of the sequential read pattern of the logical device;

determining, in accordance with one or more criteria, a set of the plurality of data storage systems that are candidates to perform processing for the sequence of subsequent reads, wherein the one or more criteria include information describing current configuration options of the plurality of data storage systems affecting I/O operation performance, said one or more criteria including, for each of the plurality of data storage systems for which the storage appliance virtualizes storage resources, an indication regarding whether said each data storage system performs sequential read pattern detection and data prefetching for detected sequential read patterns, wherein the set includes the first data storage system and a second of the plurality of data storage systems, and wherein the criteria indicates that both the first data storage system and the second data storage system for which the storage appliance virtualizes storage resources perform sequential read pattern detection and data prefetching for detected sequential read patterns, wherein the first data storage system includes a first data cache used by the first data storage system and not used by the second data storage system, the second data storage system includes a second data cache used by the second data storage system and not used by the first data storage system, a first copy of the logical device is stored on physical devices of the first data storage system, and a second copy of the logical device is stored on physical devices of the second data storage system;

determining that the plurality of read operations were previously sent to the first data storage system and not sent to the second data storage system;

responsive to determining the plurality of read operations were previously sent to the first data storage system and not sent to the second data storage system, sending, by the storage appliance, the sequence of subsequent reads to the first data storage system but not the second data storage system; and servicing, by the first data storage system, the sequence of subsequent reads using prefetched data stored in the first data cache.

10. A non-transitory computer readable medium comprising code stored thereon that, when executed, performs a method of processing I/O operations comprising:

receiving, at a storage appliance from a host, a plurality of read operations directed to a logical device having its data replicated on a plurality of data storage systems, wherein the storage appliance virtualizes storage resources of the plurality of data storage systems by presenting the storage resources to the host as a single pool of storage;

sending, by the storage appliance, the plurality of read operations to a first of the plurality of data storage systems;

detecting, by the storage appliance, that the plurality of read operations form a sequential read pattern of consecutive reads directed to consecutive logical addresses of the logical device;

identifying, by the storage appliance, a plurality of next sequential logical addresses of the sequential read pattern of the logical device;

receiving, at the storage appliance from the host, a sequence of subsequent reads directed to the next sequential logical addresses of the sequential read pattern of the logical device;

determining, in accordance with one or more criteria, a set of the plurality of data storage systems that are candidates to perform processing for the sequence of subsequent reads, wherein the one or more criteria include information describing current configuration options of the plurality of data storage systems affecting I/O operation performance, said one or more criteria including, for each of the plurality of data storage systems for which the storage appliance virtualizes storage resources, an indication regarding whether said each data storage system performs sequential read pattern detection and data prefetching for detected sequential read patterns, wherein the set includes the first data storage system and a second of the plurality of data storage systems, and wherein the criteria indicates that both the first data storage system and the second data storage system for which the storage appliance virtualizes storage resources perform sequential read pattern detection and data prefetching for detected sequential read patterns, wherein the first data storage system includes a first data cache used by the first data storage system and not used by the second data storage system, the second data storage system includes a second data cache used by the second data storage system and not used by the first data storage system, a first copy of the logical device is stored on physical devices of the first data storage system, and a second copy of the logical device is stored on physical devices of the second data storage system;

determining that the plurality of read operations were previously sent to the first data storage system and not sent to the second data storage system;

responsive to determining the plurality of read operations were previously sent to the first data storage system and not sent to the second data storage system, sending, by the storage appliance, the sequence of subsequent reads to the first data storage system but not the second data storage system; and servicing, by the first data storage system, the sequence of subsequent reads using prefetched data stored in the first data cache.

11. The non-transitory computer readable medium of claim 10, wherein the one or more criteria include an indication regarding whether each of the plurality of data storage systems performs data storage optimizations.

12. The non-transitory computer readable medium of claim 11, wherein each data storage system in the set includes a plurality of storage tiers, each of the plurality of storage tiers having physical storage devices with performance characteristics that differ from other performance characteristics of other physical storage devices of other ones of the plurality of storage tiers, and wherein the data storage optimizations include automatically relocating data portions among the plurality of storage tiers in accordance with an I/O workload associated with each of the data portions.

13. The method of claim 1, wherein the one or more criteria include, for each of the plurality of data storage systems, a data caching characteristic denoting a data cache eviction technique utilized by a data cache of said each data storage system, and a value denoting an amount of time a cached data item is expected to remain in a data cache of said each data storage system unless subsequently referenced during the amount of time.

14. The method of claim 1, wherein the method includes:
performing processing on the first data storage system to recognize the sequential read pattern of the logical device and, prior to processing the sequence of subsequent reads, prefetch data of the next sequential logical addresses of the sequential read pattern of the logical device.

* * * * *